United States Patent
Palle Venkata et al.

(10) Patent No.: US 12,369,067 B2
(45) Date of Patent: Jul. 22, 2025

(54) HANDLING HIGH DATA RATES IN PROTOCOL STACK WHEN USING HIGH FREQUENCY SPECTRUM

(71) Applicant: Apple Inc., Cupertino, CA (US)

(72) Inventors: Naveen Kumar R Palle Venkata, San Diego, CA (US); Ralf Rossbach, Munich (DE); Dawei Zhang, Saratoga, CA (US); Haijing Hu, Beijing (CN); Fangli Xu, Beijing (CN); Yuqin Chen, Shenzhen (CN); Zhibin Wu, Los Altos, CA (US); Sarma V. Vangala, Campbell, CA (US); Srinivasan Nimmala, San Jose, CA (US); Srirang A Lovlekar, Cupertino, CA (US); Sethuraman Gurumoorthy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 486 days.

(21) Appl. No.: 17/439,342

(22) PCT Filed: May 10, 2021

(86) PCT No.: PCT/CN2021/092785
§ 371 (c)(1),
(2) Date: Sep. 14, 2021

(87) PCT Pub. No.: WO2022/236583
PCT Pub. Date: Nov. 17, 2022

(65) Prior Publication Data
US 2023/0189048 A1 Jun. 15, 2023

(51) Int. Cl.
*H04W 28/02* (2009.01)
*H04L 1/1812* (2023.01)
*H04W 80/02* (2009.01)

(52) U.S. Cl.
CPC ....... *H04W 28/0231* (2013.01); *H04L 1/1812* (2013.01); *H04W 28/0278* (2013.01); *H04W 80/02* (2013.01)

(58) Field of Classification Search
CPC ......... H04W 28/0231; H04W 28/0278; H04W 80/02; H04L 1/1812
See application file for complete search history.

(56) References Cited

U.S. PATENT DOCUMENTS

2015/0305036 A1   10/2015  Lee et al.
2018/0115394 A1*  4/2018  Harada ................. H04W 72/23
(Continued)

FOREIGN PATENT DOCUMENTS

| CN | 108282279 A | 7/2018 |
|----|-------------|--------|
| CN | 110149712 A | 8/2019 |
| CN | 110574487 A | 12/2019 |

OTHER PUBLICATIONS

International Search Report and Written Opinion for PCT/CN2021/092785; 13 pages; Feb. 11, 2022.
(Continued)

*Primary Examiner* — Christopher M Crutchfield
*Assistant Examiner* — Tito Q Pham
(74) *Attorney, Agent, or Firm* — Kowert, Hood, Munyon, Rankin & Goetzel, P.C.

(57) ABSTRACT

To accommodate a mix of high frequency carriers and lower frequency carriers, a protocol stack may include a radio link control (RLC) entity that allows configuration of status reporting control parameters on per carrier, or per subcarrier spacing. Alternatively, a protocol stack may include two RLC entities, one for handling high frequency carriers, and another for handling lower frequency carriers. (High frequency carriers and lower frequency carriers may be distinguished based on a frequency threshold.) Furthermore, a user equipment may transmit (to the network) an indication
(Continued)

of its L2 buffer size. The network may configure the UE and/or control scheduling, to ensure the UE's L2 buffer does not overrun. Alternatively, the UE may indicate that it can support a percentage of a maximum buffer size. The network may configure the UE and/or control scheduling so that the UE's buffer occupancy does not exceed the percentage.

14 Claims, 20 Drawing Sheets

(56) References Cited

U.S. PATENT DOCUMENTS

| | | | | |
|---|---|---|---|---|
| 2018/0310192 | A1* | 10/2018 | Bergquist | H04L 1/1848 |
| 2018/0324642 | A1* | 11/2018 | Yu | H04L 5/0053 |
| 2020/0107394 | A1 | 4/2020 | Lee | |
| 2020/0314690 | A1* | 10/2020 | Kim | H04W 4/70 |
| 2021/0195444 | A1* | 6/2021 | Teyeb | H04W 24/04 |
| 2021/0368401 | A1* | 11/2021 | Yang | H04W 24/10 |
| 2022/0061072 | A1* | 2/2022 | Khoshnevisan | H04W 72/0453 |
| 2022/0078661 | A1* | 3/2022 | Wang | H04W 28/0263 |

OTHER PUBLICATIONS

Intel Corporation "Routing restriction and security for aggregation within NR"; 3GPP TSG-RAN WG2 Meeting #95bis R2-166886; Kaohsiung; 3 pages; Oct. 14, 2016.

Extended European Search Report EP 21941159.2; Dec. 17, 2024.

"3rd Generation Partnership Project; Technical Specification Group Radio Access Network; Evolved Universal Terrestrial Radio Access (E-UTRA) and NR; Multi-connectivity; Stage 2 (Release 16)", 3GPP Standard; 3GPP TS 37.340; Mar. 29, 2021.

"3rd Generation Partnership Project; Technical Specification Group Radio Access Network; NR; Radio Link Control (RLC) protocol specification (Release 16)", 3GPP Standard; 3GPP TS 38.322, V16.2.0; Jan. 6, 2021.

"3rd Generation Partnership Project; Technical Specification Group Radio Access Network; NR; NR and NG-RAN overall Description; Stage 2 (Relase 16)", 3GPP Standard; 3GPP TS 38.300, V16.5.0; Mar. 29, 2021.

* cited by examiner

| SCS (KHz) | RLC RTT (ms) |
|---|---|
| 15 KHz | 50 |
| 30 KHz | 40 |
| 60 KHz | 30 |
| 120 KHz | 20 |

FIG. 8 data rate (in Mbps) =
$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)}) \right)$$

J is the number of aggregated component carriers in a band or band combination
$R_{max} = 948/1024$
For the i-th CC.

$v_{Layers}^{(j)}$ is the maximum number of supported layers given by higher layer parameter *maxNumberMIMO-LayersPDSCH* for downlink and maximum of higher layer parameters *maxNumberMIMO-LayersCB-PUSCH* and *maxNumberMIMO-LayersNonCB-PUSCH* for uplink.

FIG. 9A $Q_m^{(j)}$ is the maximum supported modulation order given by higher layer parameter *supportedModulationOrderDL* for downlink and higher payer parameter *supportedModulationOrderUL* for uplink.

$f^{(j)}$ is the scaling factor given by higher layer parameter *scalingFactor* and can take values 1, 0.8, 0.75, and 0.4.

μ is the numerlogy (e.g., as defined in TS 38.211)

$T_s^\mu$ is the average OFDM symbol duration in a subframe for numerology μ, i.e., $T_s^\mu = \dfrac{10^{-3}}{14 \cdot 2^\mu}$ Note that normal cyclic prefix is assumed.

1450 configure a protocol stack of the apparatus to handle a plurality of carriers, where the protocol stack includes a radio link control (RLC) entity, wherein one or more status reporting control parameters of the RLC entity are configured separately for each of the carriers   1455

FIG. 14C

1475 configure a protocol stack of the apparatus to handle a plurality of carriers, where the protocol stack includes a radio link control (RLC) entity, where two or more different subcarrier spacings are represented among the plurality of carriers, where one or more status reporting control parameters of the RLC entity are configured separately for each subcarrier spacing   1480

FIG. 14D $$\begin{aligned}
&\text{MaxULDataRate\_MN} * \text{RLCRTT\_MN} + \\
&\text{MaxULDataRate\_SN} * \text{RLCRTT\_SN} + \\
&\text{MaxDLDataRate\_SN} * \text{RLCRTT\_SN} + \\
&\text{MaxDLDataRate\_MN} * (\text{RLCRTT\_SN} + \text{X2/Xn delay} + \text{Queuing in SN});
\end{aligned}$$

$$\begin{aligned}
&\text{MaxULDataRate\_MN} * \text{RLCRTT\_MN} + \\
&\text{MaxULDataRate\_SN} * \text{RLCRTT\_SN} + \\
&\text{MaxDLDataRate\_MN} * \text{RLCRTT\_MN} + \\
&\text{MaxDLDataRate\_SN} * (\text{RLCRTT\_MN} + \text{X2/Xn delay} + \text{Queuing in MN}).
\end{aligned}$$

*Fig. 15A*

X2/Xn + Queuing_in_SN = 25ms if SCG is NR, and 55ms if SCG is EUTRA.
X2/Xn + Queuing_in_MN = 25ms if MCG is NR, and 55ms if MCG is EUTRA.
RLC RTT for EUTRA cell group = 75ms.

determine a percentage of a maximum size of an L2 buffer of a user equipment (UE) 1610

control a process of scheduling for the UE so that a buffer occupancy of the UE's L2 buffer does not exceed said percentage of the maximum size 1615

receive buffer size information indicating a size of an L2 buffer of a user equipment (UE) 1710

control a process of scheduling for the UE so that a buffer occupancy of the UE's L2 buffer does not exceed the indicated size 1715

*FIG. 17*

HANDLING HIGH DATA RATES IN PROTOCOL STACK WHEN USING HIGH FREQUENCY SPECTRUM

PRIORITY CLAIM INFORMATION

This application is a U.S. national stage application of International Application No. PCT/CN2021/092785, filed on May 10, 2021, titled "Handling High Data Rates in Protocol Stack when Using High Frequency Spectrum", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present disclosure relates to the field of wireless communication, and more particularly, to mechanisms for handling higher data rates in a protocol stack when using high frequency spectrum, i.e., spectrum above a frequency threshold.

DESCRIPTION OF THE RELATED ART

A user equipment (UE) may communicate with a base station using one or more carriers, e.g., in a carrier aggregation configuration. Furthermore, the UE may communicate with two base stations simultaneously, e.g., in a dual connectivity configuration. A first of the base stations may host a first group of cells, and a second of the base stations may host a second group of cells. Each cell may have a respective carrier. Carriers operating at high frequencies may have high data rates, e.g., data rates large enough to impose a substantial demand on the amount of L2 buffering required at the UE and/or at the network. Thus, there exists a need for mechanisms capable of easing the amount of L2 buffering, especially when operating at high frequencies.

SUMMARY

In some embodiments, an apparatus may include processing circuitry, where the processing circuitry is configured to perform operations. The operations may include configuring a protocol stack of the apparatus to use a plurality of carriers. The protocol stack may include a first radio link control (RLC) entity and a second RLC entity, both interfaced with a packet data convergence protocol (PDCP) entity. The carriers may include one or more first carriers whose respective carrier frequencies are below a frequency threshold, and one or more second carriers whose respective carrier frequencies are greater than or equal to the threshold. The action of configuring the protocol stack may include: configuring the first RLC entity to handle the first carriers; and configuring the second RLC entity to handle the second carriers.

In some embodiments, an apparatus may include processing circuitry, where the processing circuitry is configured to perform operations. The operations may include configuring a protocol stack of the apparatus to handle a plurality of carriers, where the protocol stack includes a radio link control (RLC) entity. One or more status reporting control parameters of the RLC entity may be configured separately for each of the carriers.

In some embodiments, an apparatus may include processing circuitry, where the processing circuitry is configured to perform operations. The operations may include configuring a protocol stack of the apparatus to handle a plurality of carriers, where the protocol stack includes a radio link control (RLC) entity. Two or more different subcarrier spacings may be represented among the plurality of carriers. One or more status reporting control parameters of the RLC entity may be configured separately for each subcarrier spacing.

In some embodiments, an apparatus may include processing circuitry, wherein the processing circuitry is configured to cause a base station to perform operations. The operations may include determining a percentage of a maximum size of an L2 buffer of a user equipment (UE). The operations may also include controlling a process of scheduling for the UE so that a buffer occupancy of the UE's L2 buffer does not exceed said percentage of the maximum size. The term "L2" may refer to the combination of the PDCP, RLC and MAC layers, while "L1" refers to the physical layer.

In some embodiments, an apparatus may include processing circuitry, wherein the processing circuitry is configured to cause a base station to perform operations. The operations may include receiving buffer size information indicating a size of an L2 buffer of a user equipment (UE). The operations may also include controlling a process of scheduling for the UE so that a buffer occupancy of the UE's L2 buffer does not exceed the indicated size.

In some embodiments, a non-transitory memory medium may store program instructions. The program instructions, when executed by processing circuitry, may cause the processing circuitry to perform any of the method embodiments described above.

In some embodiments, a user equipment (UE) device may include a radio subsystem; processing circuitry coupled to the radio subsystem; and memory storing program instructions. The program instructions, when executed by the processing circuitry, may cause the UE device to perform any of the method embodiments described above.

In some embodiments, a non-transitory memory medium may store program instructions. The program instructions, when executed by processing circuitry, may cause the processing circuitry to perform any of the method embodiments described above.

In some embodiments, a base station may include a radio subsystem; processing circuitry coupled to the radio subsystem; and memory storing program instructions. The program instructions, when executed by the processing circuitry, may cause the base station to perform any of the method embodiments described above.

BRIEF DESCRIPTION OF THE DRAWINGS

A better understanding of the present subject matter can be obtained when the following detailed description of the preferred embodiment is considered in conjunction with the following drawings.

FIG. 8 is an example of a table relating subcarrier spacing (SCS) and round trip time (RTT), according to some embodiments.

FIGS. 9A and 9B illustrate an example of a data rate equation, and the definition of various terms in the equation, according to some embodiments.

FIG. 14C illustrates a method for configuring a protocol stack with per-carrier RLC configuration information, according to some embodiments.

FIG. 14D illustrates a method for configuring a protocol stack with RLC configuration information per subcarrier-spacing, according to some embodiments.

FIG. 15A presents expressions that may be used to compute a total L2 buffer size, according to some embodiments.

FIG. 15B presents a number of constraints that may be imposed on variables in the expressions of 15A, according to some embodiments.

FIG. 16 illustrates a method of controlling the buffer occupancy of an L2 buffer of a user equipment, using a determine percentage of a maximum buffer size, according to some embodiments.

FIG. 17 illustrates a method of controlling the buffer occupancy of an L2 buffer of a user equipment, using received size information indicating the size of a UE's L2 buffer, according to some embodiments.

Figure 1:
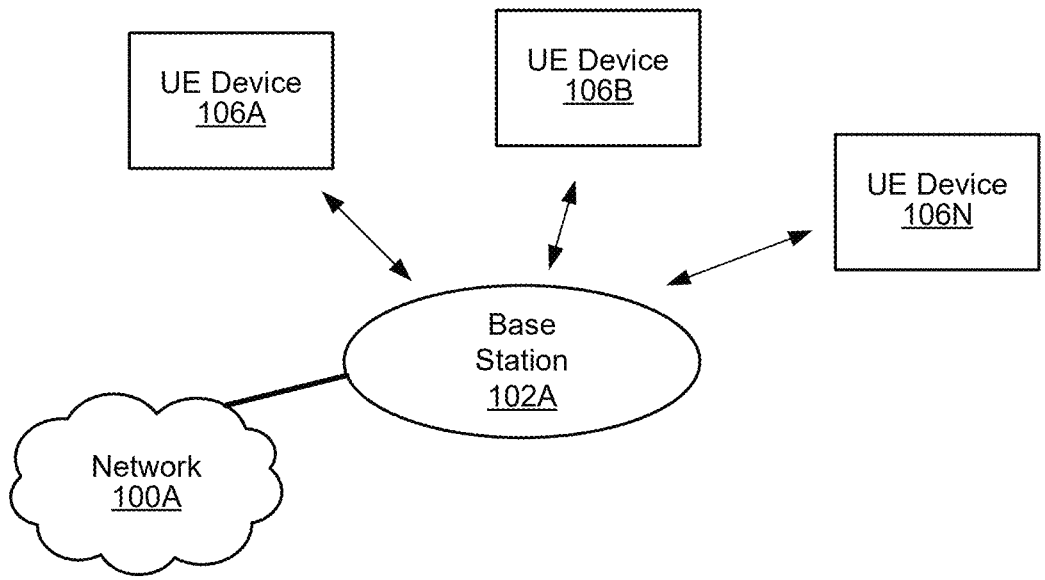
FIGS. 1-2 illustrate examples of wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
5G NR: $5^{th}$ Generation New Radio
BM: Beam Management
BW: Bandwidth
BWP: Bandwidth Part
CA: Carrier Aggregation
CC: Component Carrier
CSI: Channel State Information
CSI-RS: CSI Reference Signal
DCI: Downlink Control Information
DL: Downlink
DRB: Data Radio Bearer
eNB (or eNodeB): Evolved Node B, i.e., the base station of 3GPP LTE
EN-DC: E-UTRA-NR Dual Connectivity
E-UTRA: Evolved Universal Terrestrial Radio Access
FR n: Frequency Range n
gNB (or gNodeB): next Generation NodeB, i.e., the base station of 5G NR
GSM: Global System for Mobile Communications
HARQ: Hybrid ARQ
LBT: Listen Before Talk
LTE: Long Term Evolution
LTE-A: LTE-Advanced
MAC: Medium Access Control
MAC-CE: MAC Control Element
MCS: Modulation & Coding Scheme
MIMO: Multiple-Input Multiple-Output
NR: New Radio
NR-DC: NR Dual Connectivity
NSA: Non-Standalone
NW: Network
PBCH: Physical Broadcast Channel
PDCCH: Physical Downlink Control Channel
PDCP: Packet Data Convergence Protocol
PDU: Protocol Data Unit
PDSCH: Physical Downlink Shared Channel
PRB: Physical Resource Block
QAM: Quadrature Amplitude Modulation
RAN: Radio Access Network
RAT: Radio Access Technology
RLC: Radio Link Control
RLM: Radio Link Monitoring
RNTI: Radio Network Temporary Identifier
RRC: Radio Resource Control
RRM: Radio Resource Management
RS: Reference Signal
RTT: Round Trip Time
SCS: Subcarrier Spacing
SN: Sequence Number
SR: Scheduling Request
SSB: Synchronization Signal/PBCH Block
TB: Transport Block UE: User Equipment
UL: Uplink
UMTS: Universal Mobile Telecommunications System Terms The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
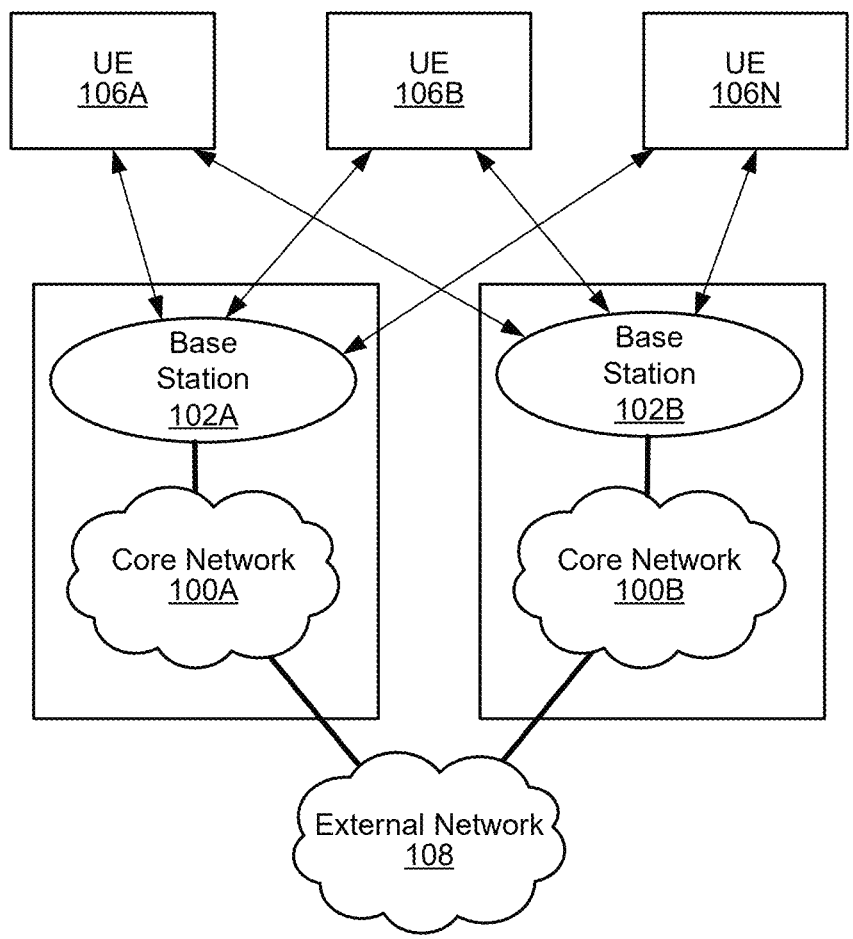
Figure 3:
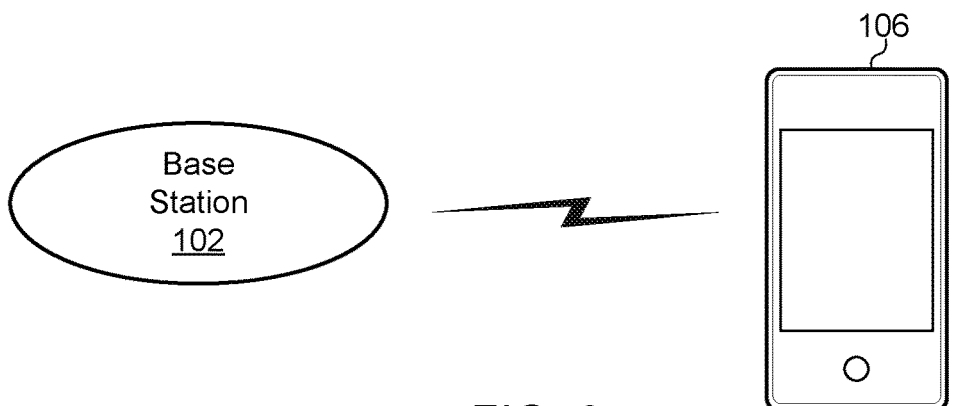
FIG. 3 illustrates an example of a base station in communication with a user equipment device, according to some embodiments.

FIGS. 1-3: Communication System

FIGS. 1 and 2 illustrate exemplary (and simplified) wireless communication systems. It is noted that the systems of FIGS. 1 and 2 are merely examples of certain possible systems, and various embodiments may be implemented in any of various ways, as desired.

The wireless communication system of FIG. 1 includes a base station 102A which communicates over a transmission medium with one or more user equipment (UE) devices 106A, 106B, etc., through 106N. Each of the user equipment devices may be referred to herein as "user equipment" (UE). In the wireless communication system of FIG. 2, in addition to the base station 102A, base station 102B also communicates (e.g., simultaneously or concurrently) over a transmission medium with the UE devices 106A, 106B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (e.g., base station 102A may be coupled to core network 100A, while base station 102B may be coupled to core network 100B), which may be a core network of a cellular service provider. Each core network 100 may be coupled to one or more external networks (such as external network 108), which may include the Internet, a Public Switched Telephone Network (PSTN), or any other network. Thus, the base station 102A may facilitate communication between the user devices and/or between the user devices and the network 100A; in the system of FIG. 2, the base station 102B may facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., bxRTT, 1×EV-DO, HRPD, eHRPD), Wi-Fi, WiMAX etc.

For example, base station 102A and core network 100A may operate according to a first cellular communication standard (e.g., LTE) while base station 102B and core network 100B operate according to a second (e.g., different) cellular communication standard (e.g., GSM, UMTS, and/or one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and CDMA 1×RTT, GSM and UMTS, or any other combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, LTE, or LTE-A). Thus, as noted above, a UE 106 might be configured to communicate with base station 102A (and/or other base stations) according to a first cellular communication standard (e.g., LTE) and might also be configured to communicate with base station 102B (and/or other base stations) according to a second cellular communication standard (e.g., one or more CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B). The UE 106 may be a device with wireless network connectivity such as a mobile phone, a hand-held device, a computer or a tablet, a wearable device or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS (W-CDMA, TD-SCDMA, etc.), CDMA2000 (1×RTT, 1×EV-DO, HRPD, eHRPD, etc.), LTE, LTE-A, WLAN, or GNSS. Other combinations of wireless communication standards are also possible.

The UE 106 may include one or more antennas for communicating using one or more wireless communication protocols. Within the UE 106, one or more parts of a receive and/or transmit chain may be shared between multiple wireless communication standards; for example, the UE 106 might be configured to communicate using either (or both) of GSM or LTE using a single shared radio. The shared radio may include a single antenna, or may include multiple antennas (e.g., for MIMO or beamforming) for performing wireless communications. MIMO is an acronym for Multi-Input Multiple-Output.

Figure 4:
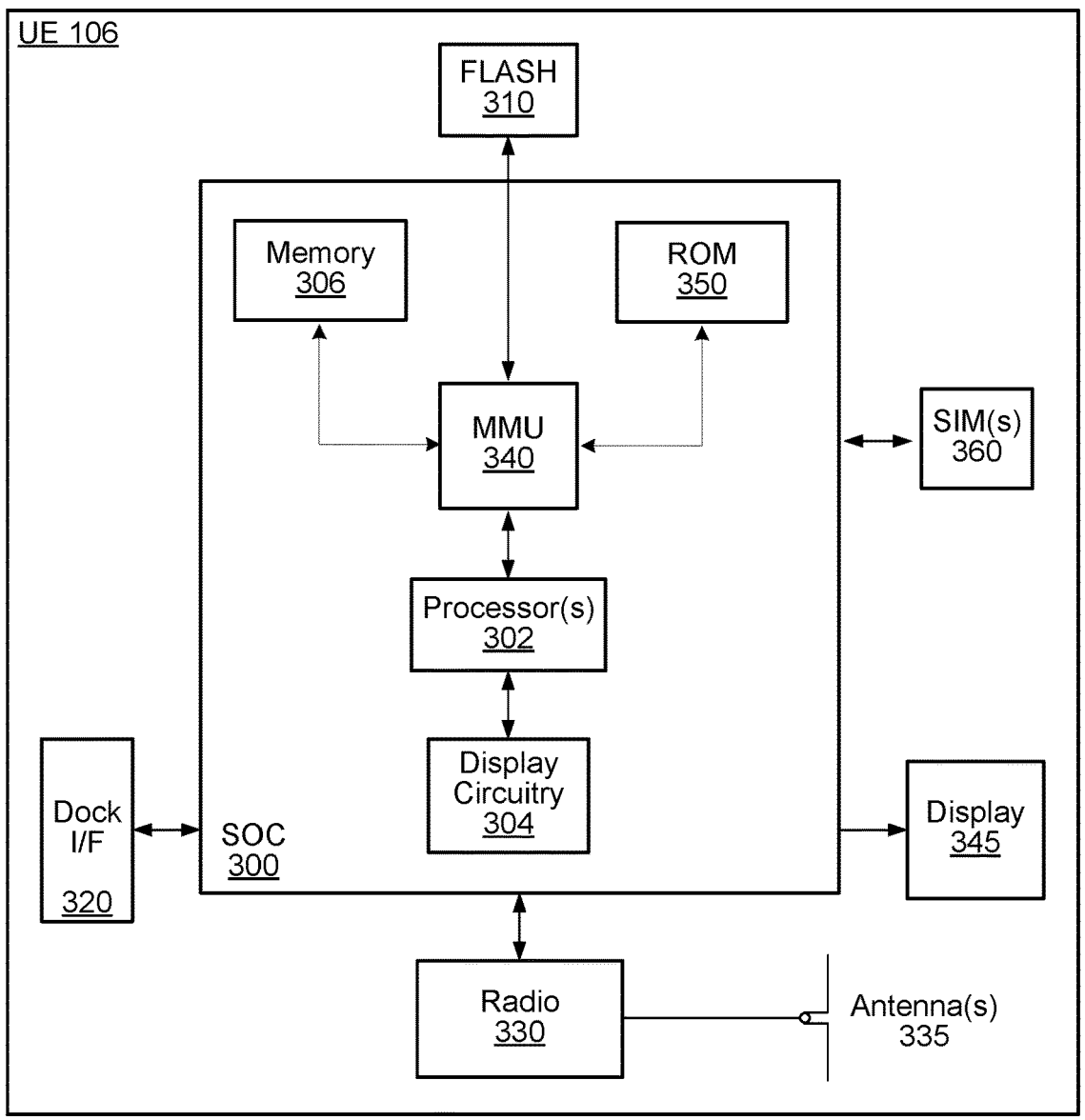
FIG. 4 illustrates an example of a block diagram of a user equipment (UE) device, according to some embodiments.

FIG. 4—Example of Block Diagram of a UE

FIG. 4 illustrates an example of a block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash memory 310), a connector interface 320 (e.g., for coupling to a computer system, dock, charging station, etc.), the display 345, and radio 330.

The radio 330 may include one or more RF chains. Each RF chain may include a transmit chain, a receive chain, or both. For example, radio 330 may include two RF chains to support dual connectivity with two base stations (or two cells). The radio may be configured to support wireless communication according to one or more wireless communication standards, e.g., one or more of GSM, UMTS, LTE, LTE-A, WCDMA, CDMA2000, Bluetooth, Wi-Fi, GPS, etc.

The radio 330 couples to antenna subsystem 335, which includes one or more antennas. For example, the antenna subsystem 335 may include a plurality of antennas to support applications such as dual connectivity or MIMO or beamforming. The antenna subsystem 335 transmits and receives radio signals to/from one or more base stations or devices through the radio propagation medium, which is typically the atmosphere.

In some embodiments, the processor(s) 302 may include a baseband processor to generate uplink baseband signals and/or to process downlink baseband signals. The processor(s) 302 may be configured to perform data processing according to one or more wireless telecommunication standards, e.g., one or more of GSM, UMTS, LTE, LTE-A, WCDMA, CDMA2000, Bluetooth, Wi-Fi, GPS, etc.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more sensors, one or more buttons, sliders, and/or dials, and/or any of various other elements capable of providing information to a user and/or receiving/interpreting user input.

As shown, the UE 106 may also include one or more subscriber identity modules (SIMs) 360. Each of the one or more SIMs may be implemented as an embedded SIM (eSIM), in which case the SIM may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Flash 310) executing on a processor (such as processor 302) in the UE 106. As one example, a SIM 360 may be an application which executes on a Universal Integrated Circuit Card (UICC). Alternatively, or in addition, one or more of the SIMs 360 may be implemented as removable SIM cards.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as or include: a programmable hardware element, such as an FPGA (Field Programmable Gate Array); or an ASIC (Application Specific Integrated Circuit); or a combination thereof.

Figure 5:
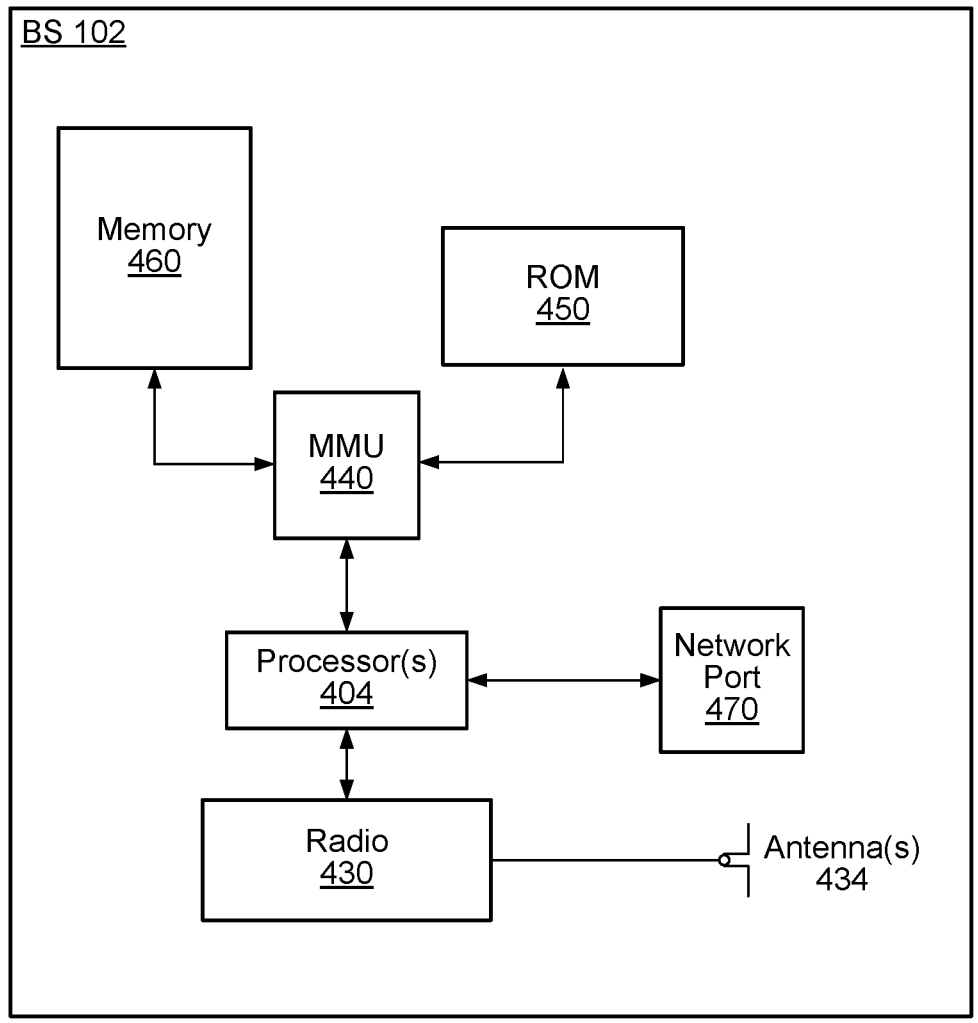
FIG. 5 illustrates an example of a block diagram of a base station, according to some embodiments.

FIG. 5—Example of a Base Station

FIG. 5 illustrates a block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory ROM 450) or to other circuits or devices.

The base station 102 may include at least one network port 470. The network port 470 may be configured to couple to a telephone network and provide access (for a plurality of devices, such as UE devices 106) to the telephone network, as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430 having one or more RF chains. Each RF chain may include a transmit chain, a receive chain, or both. (For example, the base station 102 may include at least one RF chain per sector or cell.) The radio 430 couples to antenna subsystem 434, which includes one or more antennas. Multiple antennas would be needed, e.g., to support applications such as MIMO or beamforming. The antenna subsystem 434 transmits and receives radio signals to/from UEs through the radio propagation medium (typically the atmosphere).

In some embodiments, the processor(s) 404 may include a baseband processor to generate downlink baseband signals and/or to process uplink baseband signals. The baseband processor may be configured to operate according to one or more wireless telecommunication standards, including, but not limited to, GSM, LTE, 5G New Radio, WCDMA, CDMA2000, etc.

The processor(s) 404 of the base station 102 may be configured to implement any of the methods described herein, e.g., by executing program instructions stored on a memory medium (e.g., a non-transitory computer-readable memory medium). In some embodiments, the processor(s) 404 may include: a programmable hardware element, such as an FPGA (Field Programmable Gate Array); or an ASIC (Application Specific Integrated Circuit); or a combination thereof.

Figure 6:
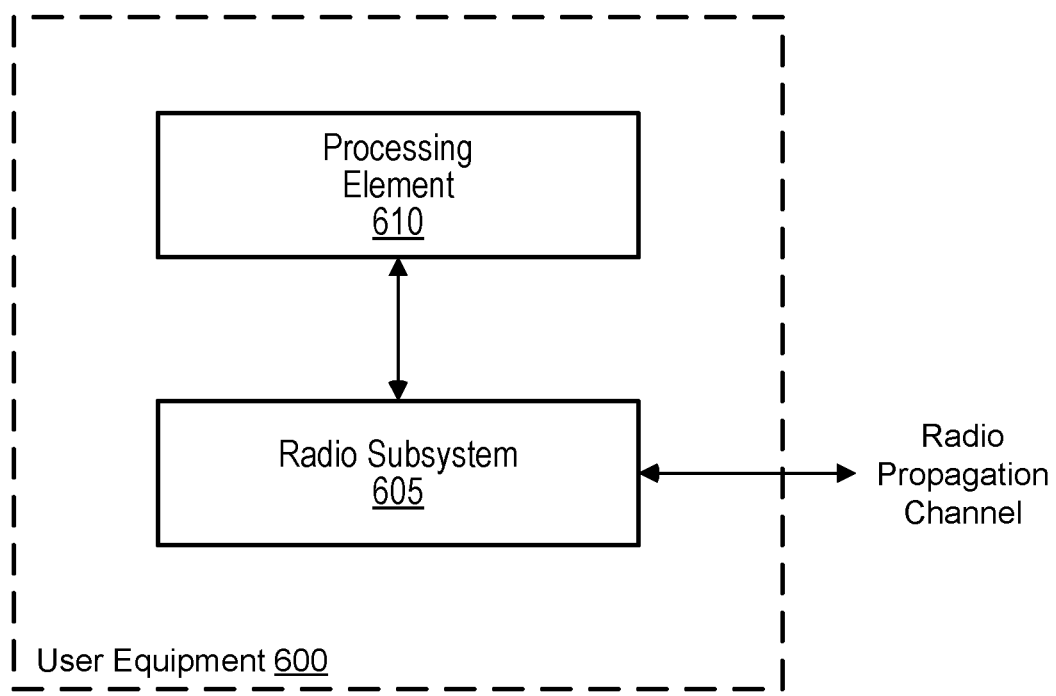
FIG. 6 illustrates an example of a user equipment 600, according to some embodiments.

In some embodiments, a wireless user equipment (UE) device 600 may be configured as shown in FIG. 6. UE device 600 may include: a radio subsystem 605 for performing wireless communication; and a processing element 610 operatively coupled to the radio subsystem. (UE device 600 may also include any subset of the UE features described above, e.g., in connection with FIGS. 1-4.)

The radio subsystem 605 may include one or more RF chains, e.g., as variously described above. Each RF chain may be configured to receive signals from the radio propagation channel and/or transmit signals onto the radio propagation channel. Thus, each RF chain may include a transmit chain and/or a receive chain. The radio subsystem 605 may be coupled to one or more antennas (or, one or more arrays of antennas) to facilitate signal transmission and reception. Each RF chain (or, some of the RF chains) may be tunable to a desired frequency, thus allowing the RF chain to receive or transmit at different frequencies at different times.

The processing element 610 may be coupled to the radio subsystem, and may be configured as variously described above. (For example, processing element may be realized by processor(s) 302.) The processing element may be configured to control the state of each RF chain in the radio subsystem. The processing element may be configured to perform any of the UE-based method embodiments described herein.

In some embodiments, the processing element may include one or more baseband processors to (a) generate baseband signals to be transmitted by the radio subsystem and/or (b) process baseband signals provided by the radio subsystem.

In a dual connectivity mode of operation, the processing element may direct a first RF chain to communicate with a first base station using a first radio access technology and direct a second RF chain to communicate with a second base station using a second radio access technology. For example, the first RF chain may communicate with an LTE eNB, and the second RF chain may communicate with a gNB of 5G New Radio (NR). The link with the LTE eNB may be referred to as the LTE branch. The link with the gNB may be referred to as the NR branch. In some embodiments, the processing element may include a first subcircuit for baseband processing with respect to the LTE branch and a second subcircuit for baseband processing with respect to the NR branch.

The processing element 610 may be further configured as variously described in the sections below.

Figure 7:
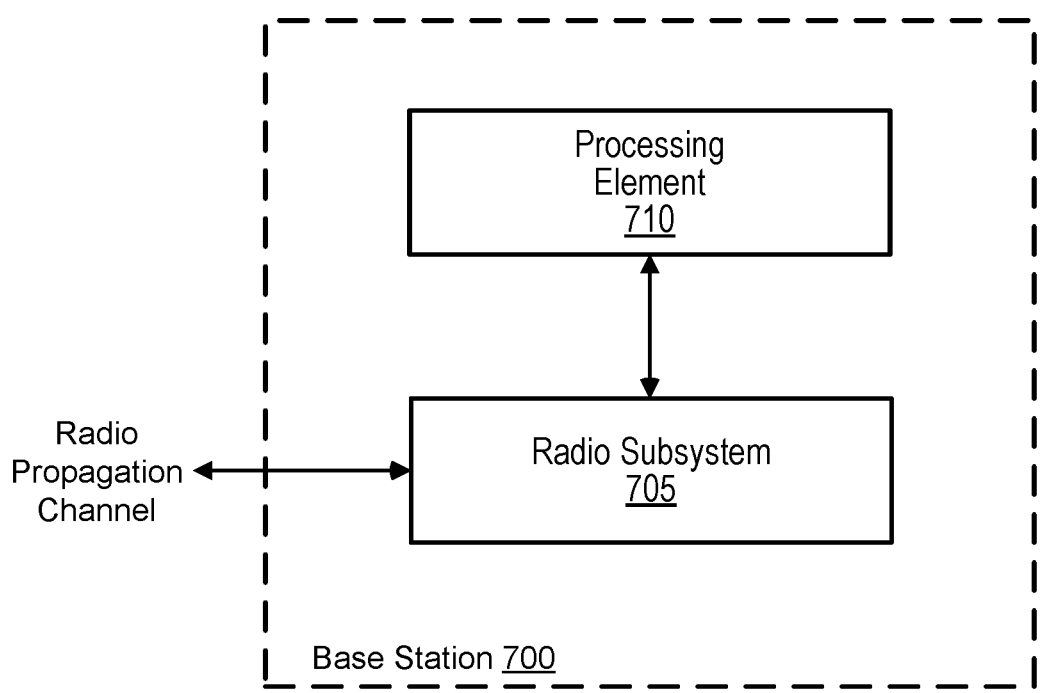
FIG. 7 illustrates an example of a base station 700, according to some embodiments. The base station 700 may be used to communicate with user equipment 600 of FIG. 6.

In some embodiments, a wireless base station 700 of a wireless network (not shown) may be configured as shown in FIG. 7. The wireless base station may include: a radio subsystem 705 for performing wireless communication over a radio propagation channel; and a processing element 710 operatively coupled to the radio subsystem. (The wireless base station may also include any subset of the base station features described above, e.g., the features described above in connection with FIG. 5.)

The radio subsystem 705 may include one or more RF chains. Each RF chain may be tunable to a desired frequency, thus allowing the RF chain to receive or transmit at different frequencies at different times. The radio subsystem 705 may be coupled to an antenna subsystem, including one or more antennas, e.g., an array of antennas, or a plurality of antenna arrays. The radio subsystem may employ the antenna subsystem to transmit and receive radio signals to/from radio wave propagation medium.

The processing element 710 may be realized as variously described above. For example, in one embodiment, processing element 710 may be realized by processor(s) 404. In some embodiments, the processing element may include one or more baseband processors to: (a) generate baseband signals to be transmitted by the radio subsystem, and/or, (b) process baseband signals provided by the radio subsystem.

The processing element 710 may be configured to perform any of the base station method embodiments described herein.

Handling High Data Rates in Protocol Stack when Using High Frequency Spectrum

In some embodiments, a user equipment (UE) and base station may be configured to support communication at high frequencies, e.g., frequencies greater than a frequency threshold. (The frequency threshold may have different values for different embodiments. For example, in some embodiments, the frequency threshold may be 52.6 GHz. In other embodiments, the frequency threshold may be 71 GHz. A wide variety of values are possible.) In some embodiments, high frequencies may include frequencies in the range from 52 GHz to 71 GHz.

At the physical layer, the UE and the base station may employ a number of procedures. For example, the channel access mechanism may utilize beam based operation in order to comply with regulatory requirements applicable to unlicensed spectrum while communicating at high frequencies.

In some embodiments, the UE and/or the base station may perform listen before talk (LBT) procedures. In other embodiments, LBT procedures are not performed.

In some embodiments, the UE and/or the base station may employ omni-directional LBT, or directional LBT and receiver assistance in channel access.

In some embodiments, the UE and/or the base station may employ energy detection threshold enhancement.

In some embodiments, the UE and/or base station may include improvements to radio interface protocol architecture and procedures. For example, for operation using high frequency carriers, the UE and/or base station may introduce support for one or more of the above described features.

In some embodiments, one or more new bands may be defined in high frequency spectrum, e.g., in the frequency range 52.6 GHz-71 GHz.

In some embodiments, the band definition(s) may include both uplink and downlink operation.

In some embodiments, the band definition(s) may exclude ITS spectrum. (ITS is an acronym for Intelligent Transportation Systems.)

Operation on High Frequency Spectrum

The following are some aspects that may influence the radio access network design on high frequency spectrum, e.g., spectrum above 52 GHz, or spectrum in the range 52.6 GHz-71 GHz, or more generally, spectrum above a defined frequency threshold.

In addition to the currently existing set of subcarrier spacing (SCS) values, one or more new SCS values may be made available. For example, values of 480 kHz and 960 kHz may be added to the existing set. (However, it should be understood that the number of additional values and their magnitudes may vary widely from embodiment to embodiment.) Support for the additional values may be optional.

In some embodiments, the base station may provide support for SSB beams. SSB is an acronym for Synchronization Signal/PBCH Block. PBCH is an acronym for Physical Broadcast Channel.

In some embodiments, the UE and/or the base station may support operation in licensed spectrum and unlicensed spectrum within the high frequency range.

In some embodiments, the maximum FFT size required to operate the system in the 52.6 GHz-71 GHz range may be 4096, and the maximum number of resource blocks (RBs)

per carrier may be 275 RBs. (In other embodiments, other values of max FFT size and max number of RBs may be employed.) Thus, while there may be an increase in bandwidth (BW) for carriers in the high frequency range, the number of frequency resources remain the same as in the current 3GPP NR definition for frequency range 2 (FR2). However, the time domain resources have increased.

Data-Rate Analysis

The following are factors that may contribute to the data-rate between a base station and the UE: the modulation and coding scheme (MCS) being employed for transmission; the number of MIMO layers, which influences the transport block size; the number of component carriers (CCs); the number of PRBs (BW) in the frequency domain; and the subcarrier spacing (SCS) in the frequency domain.

In some circumstances, high order modulations may be used, e.g., up to 1024QAM, or up to 2048QAM. The maximum modulation order may vary in different embodiments.

Note that the data rate for 120 SCS, 16 carriers, and 256QAM already strains the L2 buffer capacity of UE device, without the provision of mechanisms to decrease the Radio Link Control (RLC) round trip time (RTT). (Calculations of L2 buffer size may be based on the RTT). See FIG. 8, which presents a table of subcarrier spacing (SCS) vs. RLC RTT, according to some embodiments. See FIGS. 9A-9B, which present an example of a data rate equation, and definitions of various terms in the equation, according to some embodiments.

Note that 960 kHz is 4 times larger than 240 kHz, and 8 times larger than 120 kHz. Thus, for an SCS of 960 KHz, it would be desirable to reduce the round-trip time (RTT) to ⅛ of the RTT for the 120 KHz SCS. (One eighth of 20 ms is 2.5 ms.) Such reductions in RTT may allow the UE and/or base station to avoid L2 buffer overflows, or to avoid having to support large buffer sizes, which would be costly.

Figure 10A:
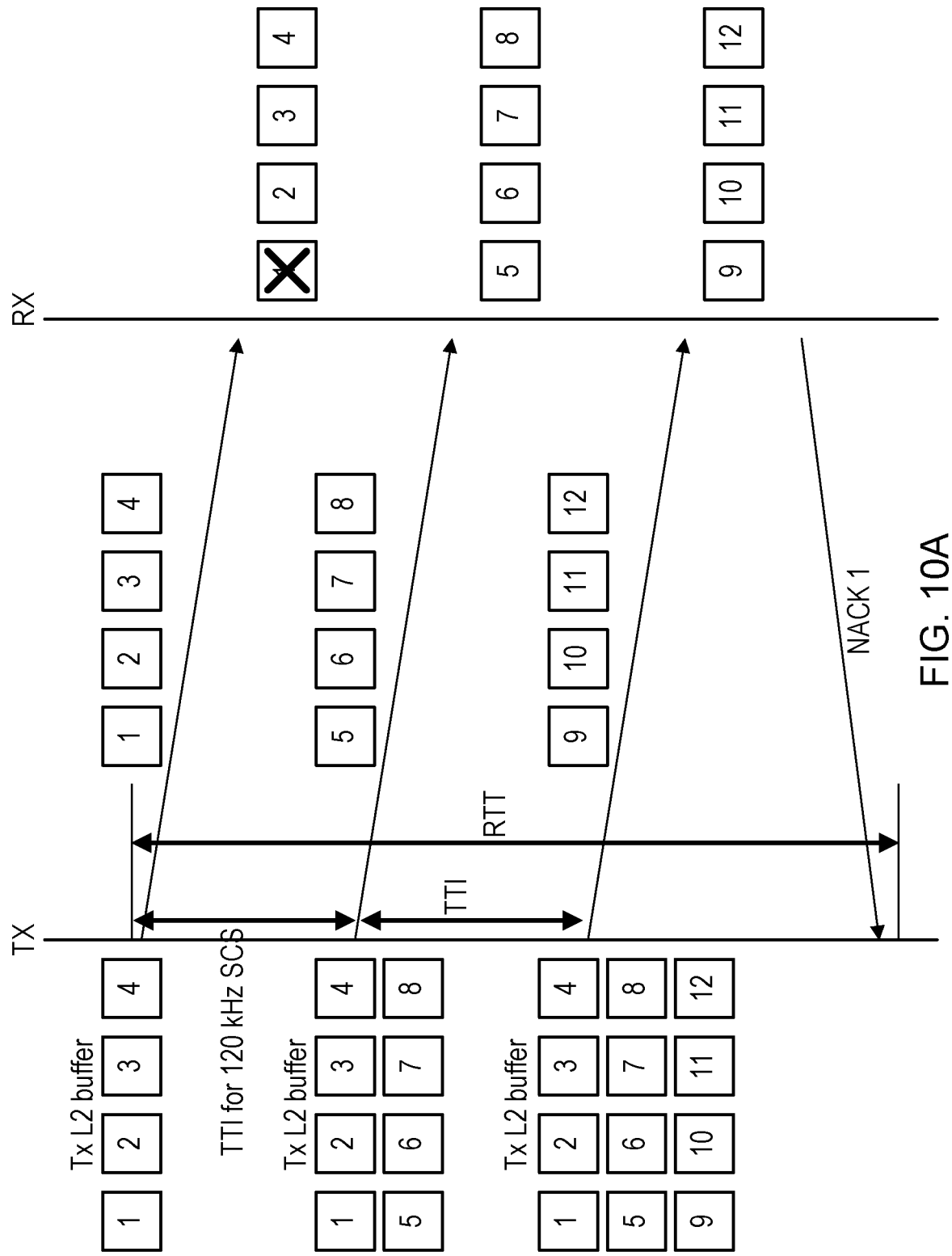
FIGS. 10A and 10B illustrate an example of the different rates of L2 buffer accumulation when subcarrier spacing is 120 kHz vs. when subcarrier spacing 960 kHz, according to some embodiments.
Figure 10B:
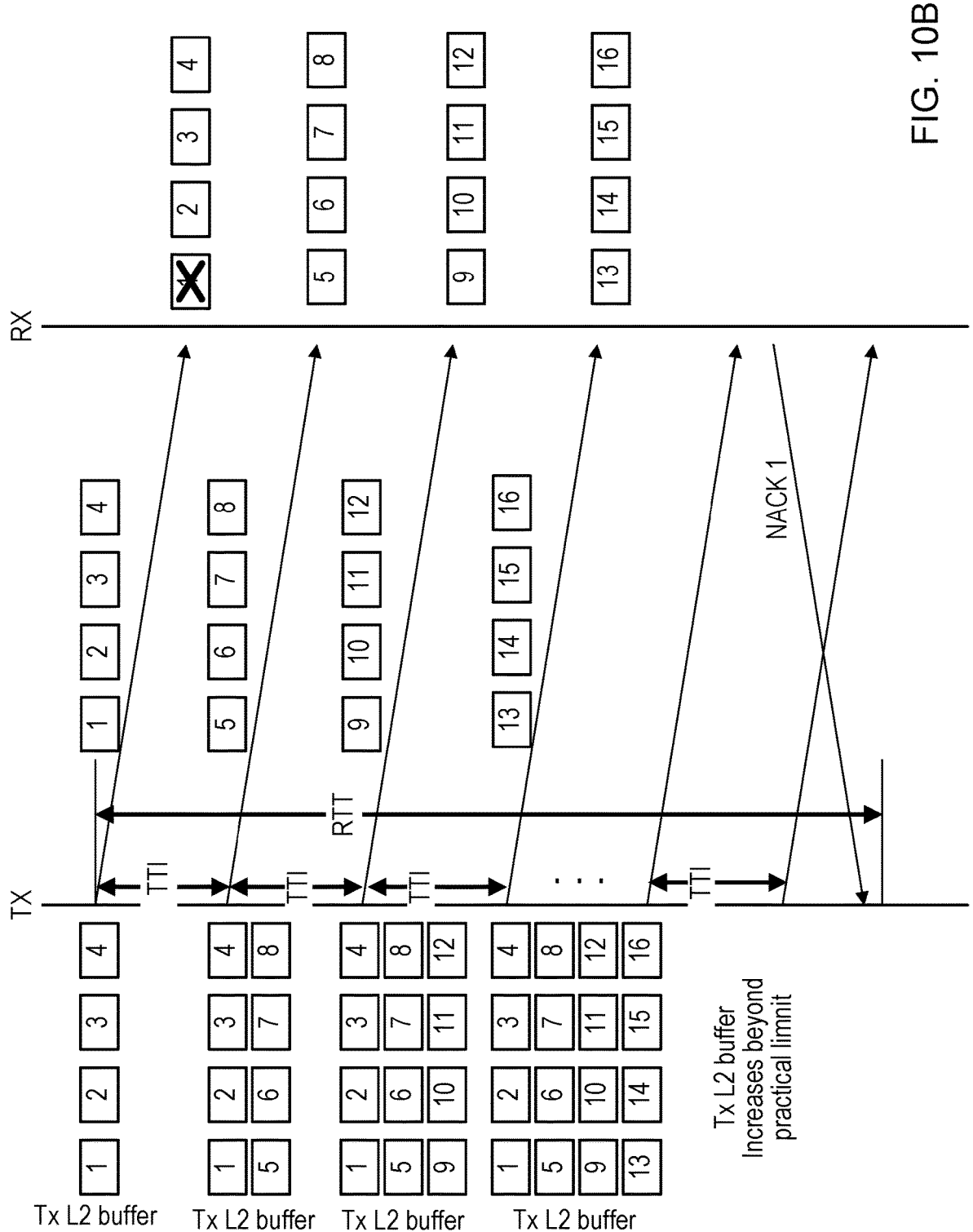

FIGS. 10A and 10B illustrate how a transmit L2 buffer may increase beyond practical limit without sufficient reduction of RTT, according to some embodiments. FIG. 10A illustrates the accumulation of RLC Protocol Data Units (PDUs) at the L2 buffer of a transmitter (TX) for the case where the transmission time interval (TTI) is set for a subcarrier spacing (SCS) of 120 kHz. In the illustrated example, four PDUs are transmitted per TTI. (However, the number of PDUs transmitted per TTI may vary from one embodiment to the next.) Some of the PDUs are successfully received by the receiver while others are missed (not successfully received). The PDU with serial number 1 is missed, as indicated by the "X" marking that PDU. With each TTI, transmitted PDUs accumulate in the transmitter's L2 buffer, until the NACK (negative acknowledgement) is received. The NACK may carry the serial number of the missing PDU: "NACK 1". The round trip time (RTT) may be defined by the duration between the transmission of a PDU and the reception of the status report relating to that PDU.

FIG. 10B illustrates the accumulation of RLC PDUs at the L2 buffer of the transmitter (TX) for the case where the TTI is set for a subcarrier spacing (SCS) of 960 kHz. (The TTI here is not drawn to scale relative to FIG. 10A. If drawn to scale the TTI here would be a factor of 8 smaller than the TTI of FIG. 10A.) Because the TTI is smaller, the PDUs accumulate in the transmitter's L2 buffer at the higher rate. Thus, if the round trip time (RTT) is not changed relative to FIG. 10A, the L2 buffer may be required to store a much larger amount of data.

Impact on Radio Link Control (RLC)

In 3GPP New Radio (NR), the round trip time (RTT) may be determined by how often the receiver feeds back status reports to the transmitter. A status report may include acknowledgements (ACKs) or negative acknowledgements (NACKs), indicating whether or not PDUs were successfully received by the receiver.

A status report is triggered by a poll-bit set by the transmitter, which triggers a status response from the receiver. In NR, the frequency of setting of the poll-bit may be determined by pollPDU and pollByte.

To prevent the transmitter from setting the poll-bit excessively often for outstanding packets, there is a timer that allows the transmitter to poll only once during the period measured out by the timer. In NR, the value of this timer is referred to as t-PollRetransmit.

However, to prevent the receiver from transmitting too many status messages (which consume bandwidth), there is a timer that prohibits the receiver from sending a status message too soon after a previous status message transmission. In NR, the value of this timer is referred to as t-statusProhibit.

To handle higher data rates, the values of pollPDU and pollByte may be configured so that in the UL, the UE transmits the pollbit often, to reduce the buffering overload. Also, the values of the timers (that prevent excessively frequent transfer of status messages) may be reduced, to allow frequent feedback, which helps with keeping the L2 buffer size within practical limits.

In 3GPP New Radio (NR), there is one RLC entity for the transmitter and one RLC entity for the receiver. (Either the UE or the NW may take the role of transmitter. If the UE (NW) takes the role of transmitter, the NW (UE) takes the role of receiver. Also, the UE may take both the role of transmitter, for uplink transmission, and the role of receiver, for downlink reception). This is the case even when there are multiple carriers in the physical layer. In other words, even when there are multiple physical channels, the RLC entity uses all of them, and performs necessary actions, such as re-ordering.

In NR, there is one set of parameters (e.g., parameters such as pollPDU, pollByte, t-PollRetransmit, etc) for each RLC pair, and this is not carrier dependent. An RLC pair includes a UE RLC entity and a corresponding NW RLC entity: (UE RLC, NW RLC).

Figure 11:
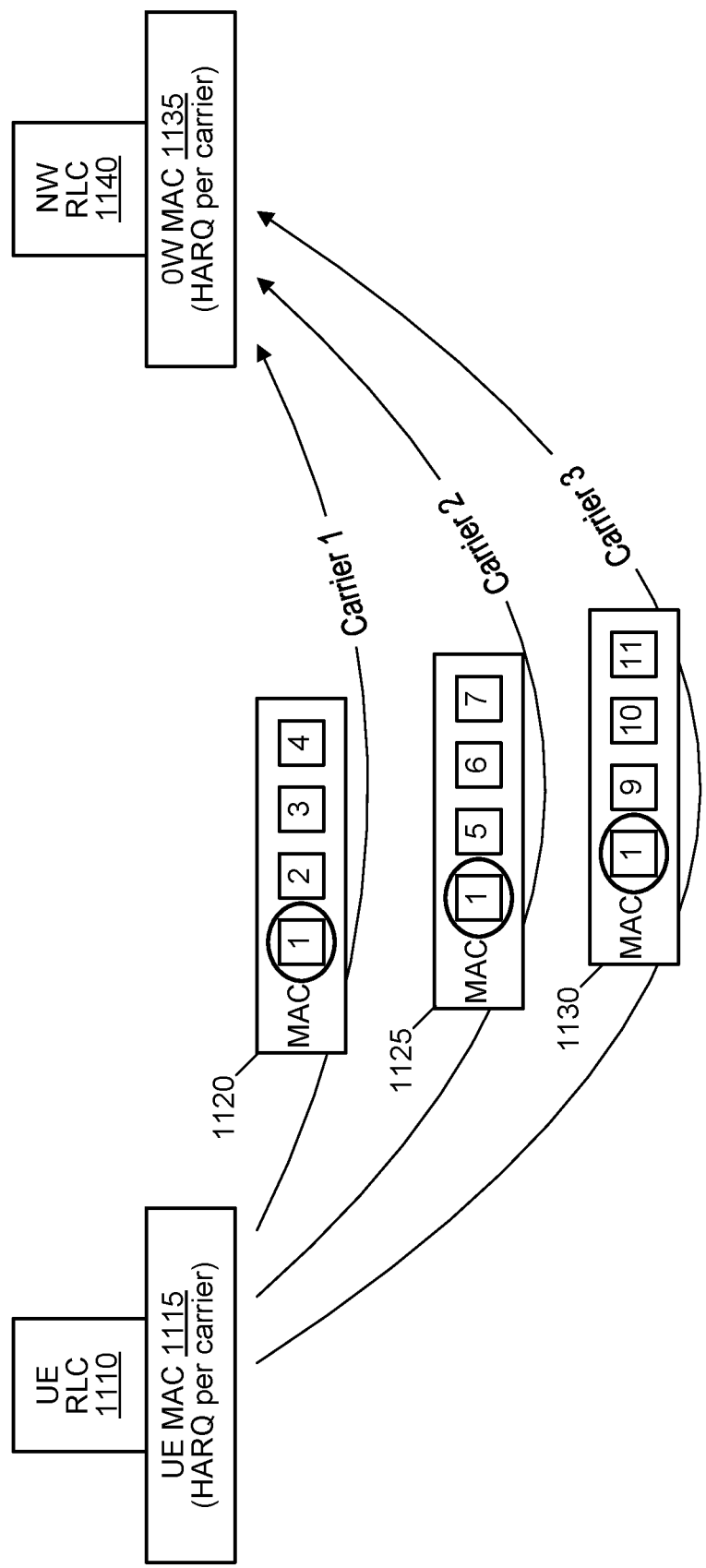
FIG. 11 illustrates an example of multicarrier transmission from the UE to the network (e.g., base station), according to some embodiments.

FIG. 11 illustrates a multicarrier transmission from the UE to the NW (e.g., base station), according to some embodiments. The UE RLC 1110 provides RLC PDUs to the UE MAC 1115. The UE MAC conducts a Hybrid Automatic Repeat Request (HARQ) process for each of the carriers. (Three carriers are illustrated. However, the number of carriers may vary widely.) The UE MAC packages RLC PDUs in MAC PDUs (such as 1120, 1125 and 1130) for transmission on the respective carriers (such as Carrier 1, Carrier 2 and Carrier 3). Note that a given RLC PDU may be included in more than one of the MAC PDUs, e.g., as illustrated with RLC PDU #1. The NW MAC 1135 receives the MAC PDUs corresponding to the respective carriers, and attempts to recover the RLC PDUs from the MAC PDUs. (The NW MAC also participates in the HARQ processes, one per carrier.) Successfully received RLC PDUs are passed to the NW RLC 1140. (The NW RLC may keep only one copy when more than one copy of an RLC PDU is received, as is the case with RLC PDU #1.)

The NW RLC may record, for each RLC PDU, whether or not reception was successful. The NW RLC may store these records until it is triggered (by the UE) to send a status report. The status report may include negative acknowledgements (NACKs) for missed RLC PDUs, and/or, acknowledgements for successfully received RLC PDUs. The contents of the status report may vary from one reporting format to another. (The NW may configured the reporting format.) The same sort of communication occurs in the reverse direction, i.e., with the NW RLC taking the role of transmitter, and the UE RLC taking the role of receiver.

When high frequency carriers (e.g., carriers above 52 GHz) are employed, they would likely be employed in a carrier aggregation (CA) scenario or a dual-connectivity (DC) scenario, where some of the carriers would be high frequency carriers and others would be lower frequency carriers.

If we have a mix of high frequency carriers and lower frequency carriers, then there arises the difficulty that, according to 3GPP NR, RLC does not allow separate configuration for different carriers or carrier classes. This is a difficulty because the high frequency carriers need reduced round trip times.

Figure 12:
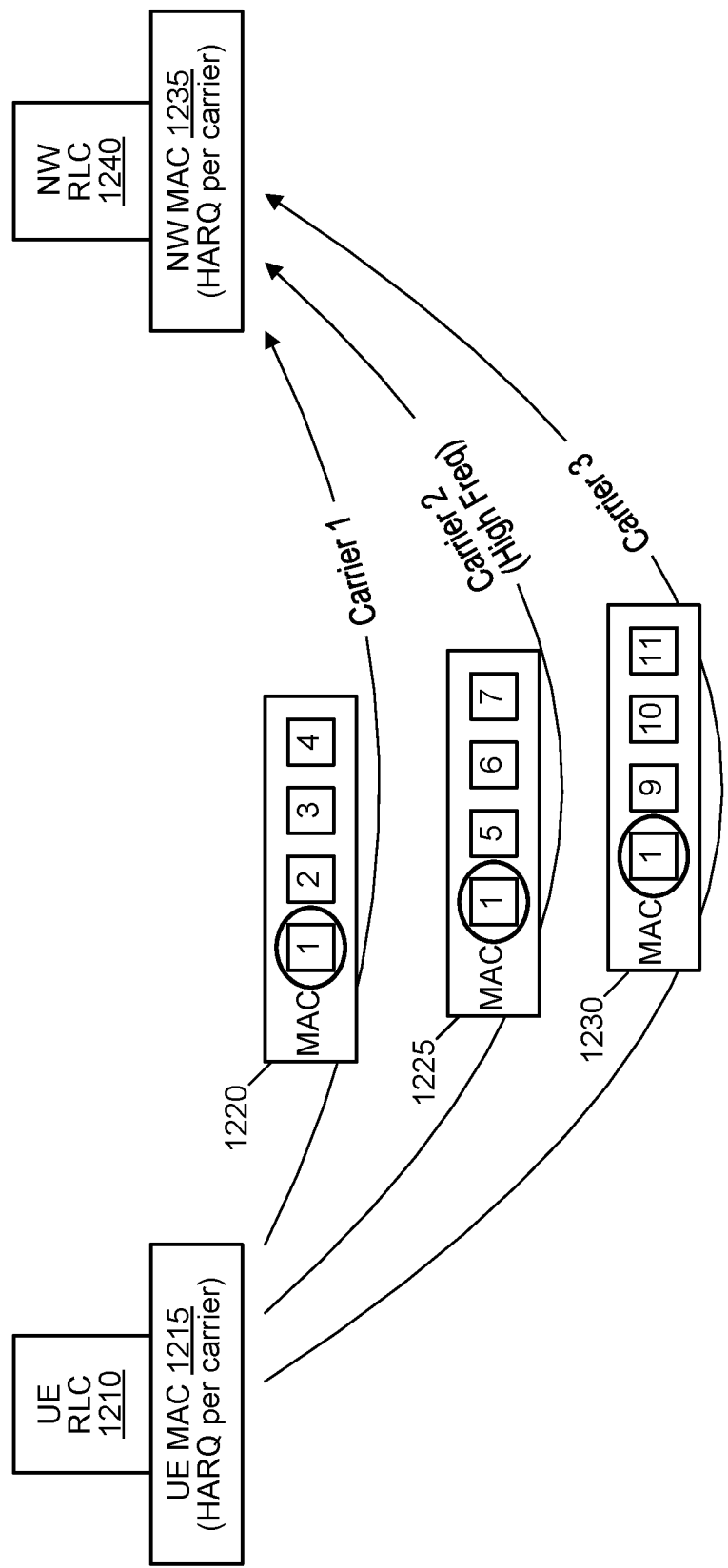
FIG. 12 illustrates a mixed carrier scenario of multicarrier transmission from the UE to the network, according to some embodiments.

FIG. 12 illustrates a mixed carrier scenario of multicarrier transmission from the UE to the NW (e.g., base station), according to some embodiments. The carriers includes one or more high frequency carriers, represented by carrier 2, and one or more lower frequency carriers, represented by carriers 1 and 3. The UE RLC 1210 provides RLC PDUs to the UE MAC 1215. The UE MAC conducts a HARQ process for each of the carriers. The UE MAC packages RLC PDUs in MAC PDUs (such as 1220, 1225 and 1230) for transmission on the respective carriers (such as Carriers 1-3). Note that a given RLC PDU may be included in more than one of the MAC PDUs, e.g., as illustrated with RLC PDU #1. The NW MAC 1235 receives the MAC PDUs corresponding to the respective carriers, and attempts to recover the RLC PDUs from the MAC PDUs. (The NW MAC also participates in the HARQ processes, one per carrier.) Successfully received RLC PDUs are passed to the NW RLC 1240. (The NW RLC may keep only one copy when more than one copy of an RLC PDU is received, as is the case with RLC PDU #1.)

Use Synchronous NR-DC for High Frequency Carriers

In some embodiments, synchronous New Radio Dual Connectivity (NR-DC) is similar to Carrier Aggregation (CA), but instead of one RLC/MAC with multiple HARQ processes, Dual Connectivity (DC) may use two RLC/MAC/PHY (one for each cell-group), and PDCP converges/deconverges the Protocol Data Units (PDUs) from/to the different RLC legs. (PDCP is an acronym for Packet Data Convergence Protocol.) The notation "RLC/MAC" denotes a combination of an RLC entity and a MAC entity in a protocol stack. The notation "RLC/MAC/PHY" denotes a combination of an RLC entity, a MAC entity, and a PHY entity. (PHY is an acronym for Physical Layer.)

Figure 13A:
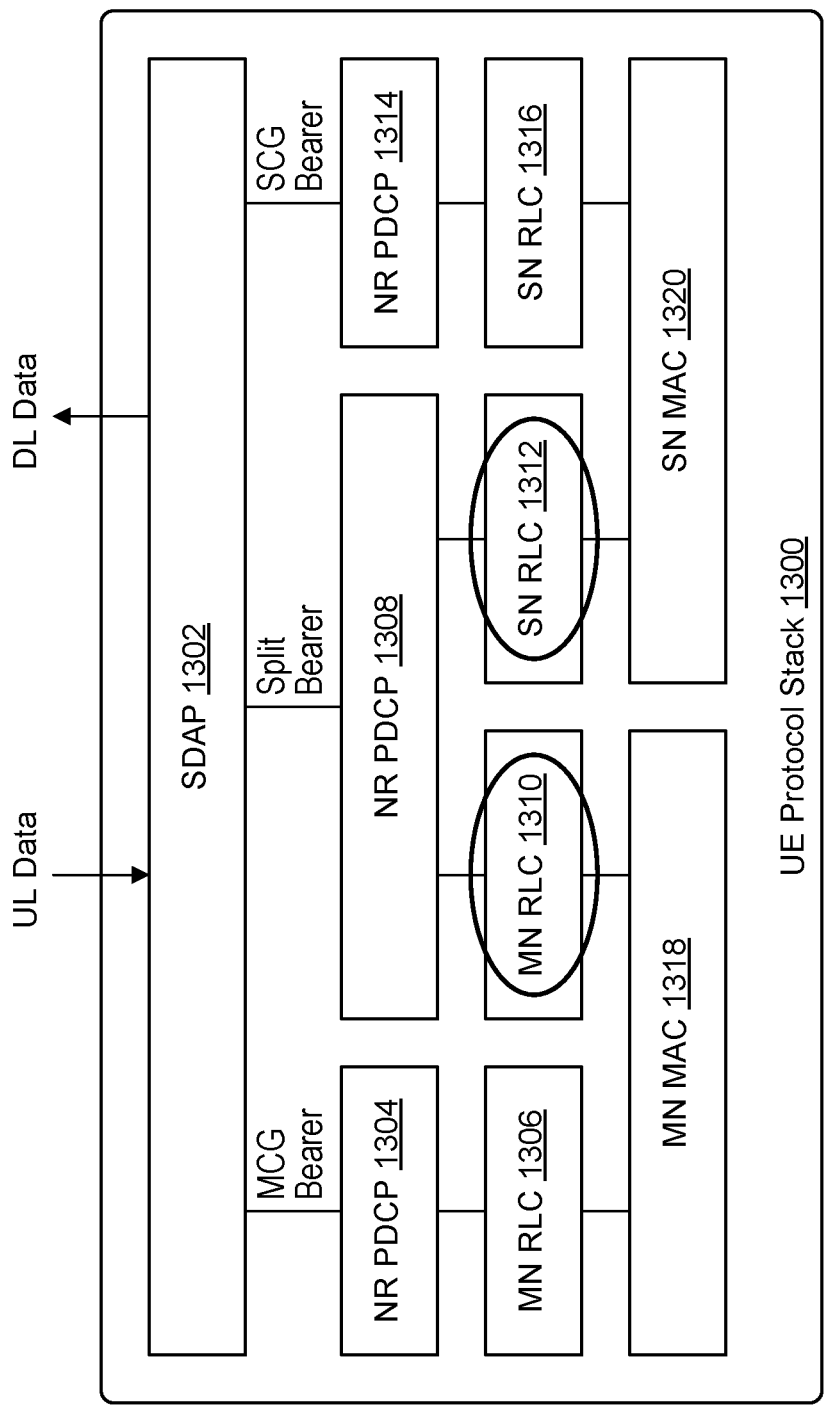
FIG. 13A illustrates an example of a protocol stack of a UE, according to some embodiments.

In some embodiments, the NW configures high frequency carriers (e.g., carriers above 52.6 GHz) in one cell group, and the lower frequency carriers (e.g., carriers belong 52.6 GHz) in the other cell group, e.g., as shown in the UE protocol stack 1300 of FIG. 13A. The UE protocol stack includes: an SDAP entity 1302; a combination of an NR PDCP entity 1304 and an MN RLC entity 1306 for an MCG bearer; a combination of an NR PDCP entity 1308, an MN RLC entity 1310 and an SN RLC entity 1312 for a split bearer; a combination of an NR PDCP entity 1314 and an SN RLC entity 1316 for an SCG bearer. (SDAP is an acronym for Service Data Adaptation Protocol. MCG is an acronym for Master Cell Group. SCG is an acronym for Secondary Cell Group. NR PDCP is an acronym for New Radio PDCP. PDCP is an acronym for Packet Data Convergence Protocol. MN is an acronym for Master Node. SN is an acronym for Secondary Node. RLC is an acronym for Radio Link Control. MAC is an acronym for Medium Access Control.) The UE may communicate with a MN (e.g., an eNB of 3GPP LTE, or a gNB or 5GNR) that hosts the master cell group, and with a SN (e.g., a gNB of 5GNR) that hosts the secondary cell group. Each cell may have a corresponding carrier. The SDAP entity may receive uplink data (e.g., user data) to be transmitted, and package (or route) the uplink data for transmission via one or more of the MCG bearer, the split bearer or the SCG bearer. Similarly, the SDAP entity may receive data portions from one or more the MCG bearer, the split bearer and SCG bearer, and output the data portions as a downlink data stream.

In some embodiments, the SN RLC entity 1312 may be configured by the network to handle the high frequency carriers while the SN RLC entity 1310 is configured to handle the lower frequency carriers. These two RLC entities may be configured with different sets of values for the status reporting control parameters, to support the different needs of the high frequency carriers vs. the lower frequency carriers.

In some embodiments, the NW may configure the signaling required to obtain a round trip time (RTT) that is sufficiently small (for faster feedback) on the RLC leg that uses the high frequency carriers, e.g., sufficiently small so that the L2 buffer at the NW and/or the L2 buffer at the UE may have size that is acceptable (i.e., not excessively large). At the UE the L2 buffer size may be limited by the amount of L2 memory built into the UE. Similarly, at the NW, the L2 buffer size may be limited by the amount of L2 memory built into the base station.

Figure 13B:
FIG. 13B illustrates a method for configuring a protocol stack to handle one or more high frequency carriers and one or more lower frequency carriers, according to some embodiments.

In one set of embodiments, a method 1350 for operating an apparatus may include the operations shown in FIG. 13B. (The method 1350 may also include any subset of the features, elements or operations described above.) The method 1350 may be performed by processing circuitry, e.g., by the processing element 710 of base station 700, or by the processing element 610 of user equipment 600.

At 1355, the processing circuitry may configure a protocol stack of the apparatus to use a plurality of carriers, where the protocol stack includes a first radio link control (RLC) entity and a second RLC entity, both interfaced with a packet data convergence protocol (PDCP) entity. The carriers may include one or more first carriers whose respective carrier frequencies are below a frequency threshold, and one or more second carriers whose respective carrier frequencies are greater than or equal to the threshold. The action of configuring the protocol stack may include: configuring the first RLC entity to handle the first carriers; and configuring the second RLC entity to handle the second carriers. (In other words, the first RLC entity may be configured to handle the RLC data that is conveyed via the first carriers; and the second RLC entity may be configured to handle the RLC data that is conveyed via the second carriers.) The first RLC entity may be dedicated for carriers below the frequency threshold; and the second RLC entity may be dedicated for carriers greater than or equal to the frequency threshold.

In some embodiments, the protocol stack may be implemented in software, in dedicated hardware, in reconfigurable logic, or in any combination of the foregoing.

In some embodiments, the first RLC entity is configured to use a first value of a status reporting control parameter, and the second RLC entity is configured to use a second value of the status reporting control parameter, where the second value is smaller than the first value, e.g., a variously described above.

In some embodiments, the status reporting control parameter represents an amount of time to count, starting from a last poll request, before re-transmitting the same poll request, in case there has been no status report from the last poll request.

In some embodiments, the status reporting control parameter represents a number of protocol data unit (PDUs) to count between successive poll request transmissions; or In some embodiments, the status reporting control parameter represents a number of bytes to be transmitted between successive poll request transmissions.

In some embodiments, the status reporting control parameter represents an amount of time to count, starting from a time of last feedback transmission (e.g., status report transmission), before allowing another feedback transmission.

In some embodiments, the first and second RLC entities are configured so that one or more RLC parameter values relating (or contributing) to round trip time are smaller for the second RLC entity than for the first RLC entity.

In some embodiments, the apparatus is (or, is included in) a user equipment (UE). The apparatus may include a radio transceiver coupled to the processing circuitry, e.g., as variously described above. The action of configuring the protocol stack may be performed in response to reception of configuration signals from a base station, e.g., configuration signals indicating the values of status reporting control parameters, as variously described above.

In some embodiments, the apparatus is (or, is included in) a base station. The apparatus may include a radio transceiver coupled to the processing circuitry.

In some embodiments, the frequency threshold is at a boundary between Frequency Range 2 and Frequency Range 3 of 3GPP 5G New Radio.

The frequency threshold may be different in different embodiments. A variety of possible values are contemplated for the frequency threshold. In some embodiments, the frequency threshold may be 52 GHz. In other embodiments, the frequency threshold may be 71 GHz. In yet other embodiments, the frequency threshold may be set at the boundary of NR FR2 and NR FR3. (NR is an acronym for New Radio. FR is an acronym for Frequency Range.) In yet other embodiments, the frequency threshold may be set at the boundary of NR FR1 and NR FR2.

Mapping RLC to Particular Carriers

One drawback of the method 1350 is that for every mode of carrier aggregation (CA), a corresponding set of dual connectivity (DC) requirements may need to be specified, and this causes the UE and NW to implement the DC requirements, simply to operate on the high frequency carriers (i.e., the carriers above the frequency threshold).

Figure 14A:
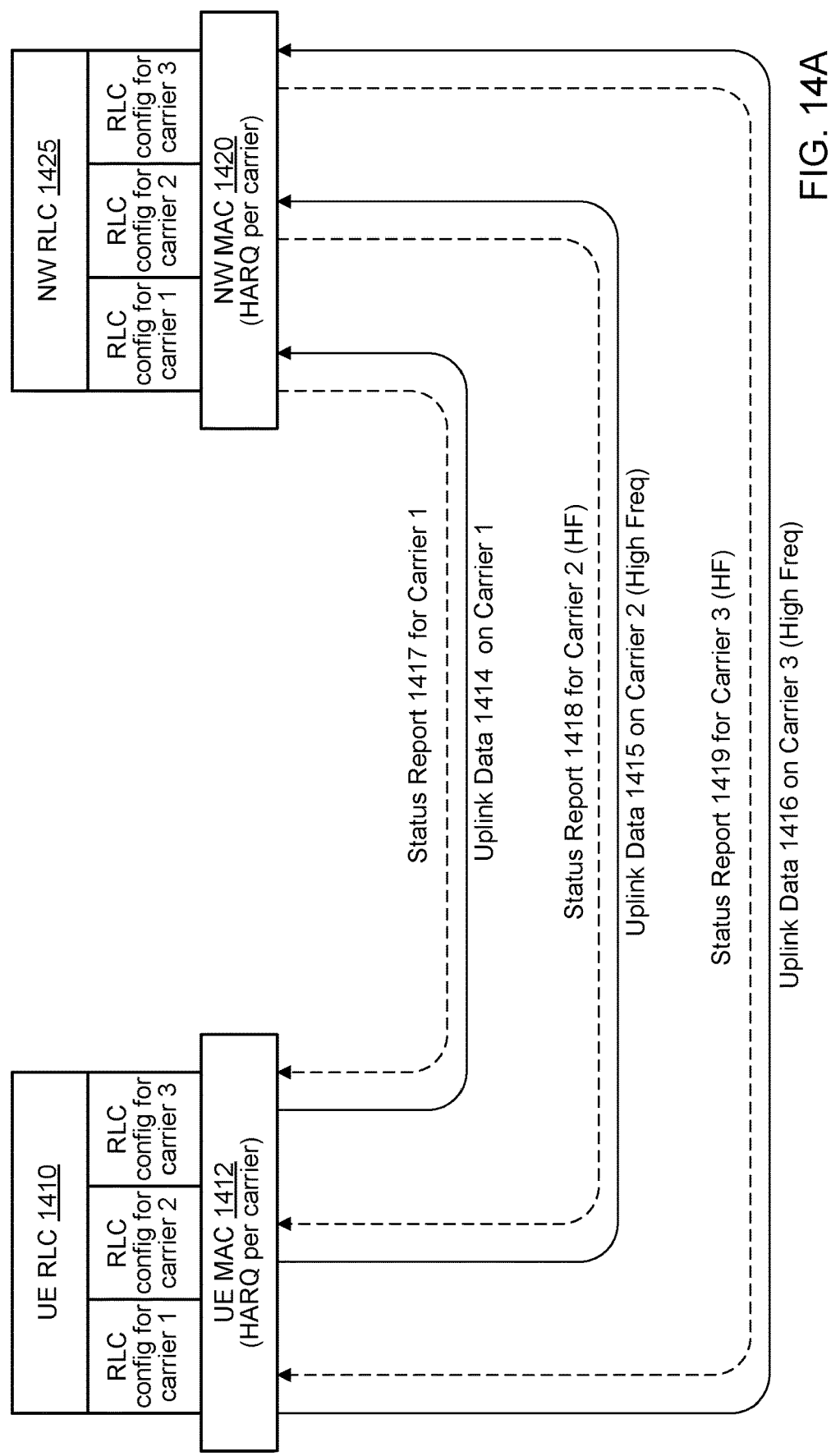
FIGS. 14A and 14B illustrate radio link control (RLC) entities (at the UE and network) that admit RLC configuration per carrier, according to some embodiments.

In some embodiments, the NW may configure RTT-related RLC information for each carrier separately, e.g., as shown in FIG. 14A, while keeping other RLC parameters the same for all carriers.

FIG. 14A illustrates a mixed carrier scenario of multicarrier transmission from the UE to the NW (e.g., base station), according to some embodiments. The carriers include one or more high frequency carriers, represented by carriers 2 and 3, and one or more lower frequency carriers, represented by carrier 1. The UE RLC entity 1410 operates according to a plurality of RLC configurations, i.e., one RLC configuration per carrier. The high frequency carriers (i.e., carriers 2 and 3) may have RLC configurations whose status reporting control parameters have reduced values as compared to the corresponding values for the low frequency carrier (i.e., carrier 1). When the UE RLC entity is sending each RLC PDU to the UE MAC entity 1412, an indication of the carrier (or carriers) to be used for transmission of the RLC PDU may be provided. The UE MAC entity may receive RLC PDUs and package the RLC PDUs in MAC PDUs for transmission on the carriers. Thus, uplink data items (e.g., MAC PDUs) 1414, 1415 and 1416 may be transmitted respectively on carriers 1, 2 and 3. The NW MAC entity 1420 receives the uplink data items, recovers the RLC PDUs, and provides the RLC PDUs to the NW RLC entity 1425. The NW RLC entity may operate according to a plurality of RLC configuration, i.e., one RLC configuration per carrier. For example, the high frequency carriers (i.e., carriers 2 and 3) may have RLC configurations whose status reporting control parameters have reduced values as compared to the corresponding values for the low frequency carrier (i.e., carrier 1).

The NW RLC 1425 may generate and transmit status reports on for the carriers based on the respective RLC configuration (and in particular, the respective set of status reporting control parameters). Thus, RLC status reports 1417, 1418 and 1419 may be transmitted respectively for carriers 1, 2 and 3. For example, the status report 1417 may include ACKs and/or NACKs for RLC PDUs transmitted via carrier 1; the status report 1418 may include ACKs and/or NACKs for RLC PDUs transmitted via carrier 2; and the status report 1419 may include ACKs and/or NACKs for RLC PDUs transmitted via carrier 3. In some embodiments, the status reports for carrier x are transmitted via carrier x, with x=1, 2, 3. Naturally, this discussion generalizes to any number of carriers and any mix of high frequency carriers and lower frequency carriers.

Furthermore, when the UE MAC 1412 receives a status report from the NW MAC, the UE MAC may recover one or more ACKs and/or one or more NACKs from the status report, and send the ACKs and NACKs to the UE RLC with corresponding indications of the carrier on which they were received. The UE RLC may then arrange for retransmission of the negatively acknowledged RLC PDUs on the same (or different) carrier.

While FIG. 14A illustrates data transmission in the uplink direction and feedback transmission (i.e., transmissions of status reports) in the downlink direction, complementary processes may be performed where the NW RLC takes the role of transmitter and the UE RLC takes the role of receiver. Thus, data may be transmitted in the downlink direction and feedback may be transmitted in the uplink direction, e.g., as shown in FIG. 14B.

Figure 14B:
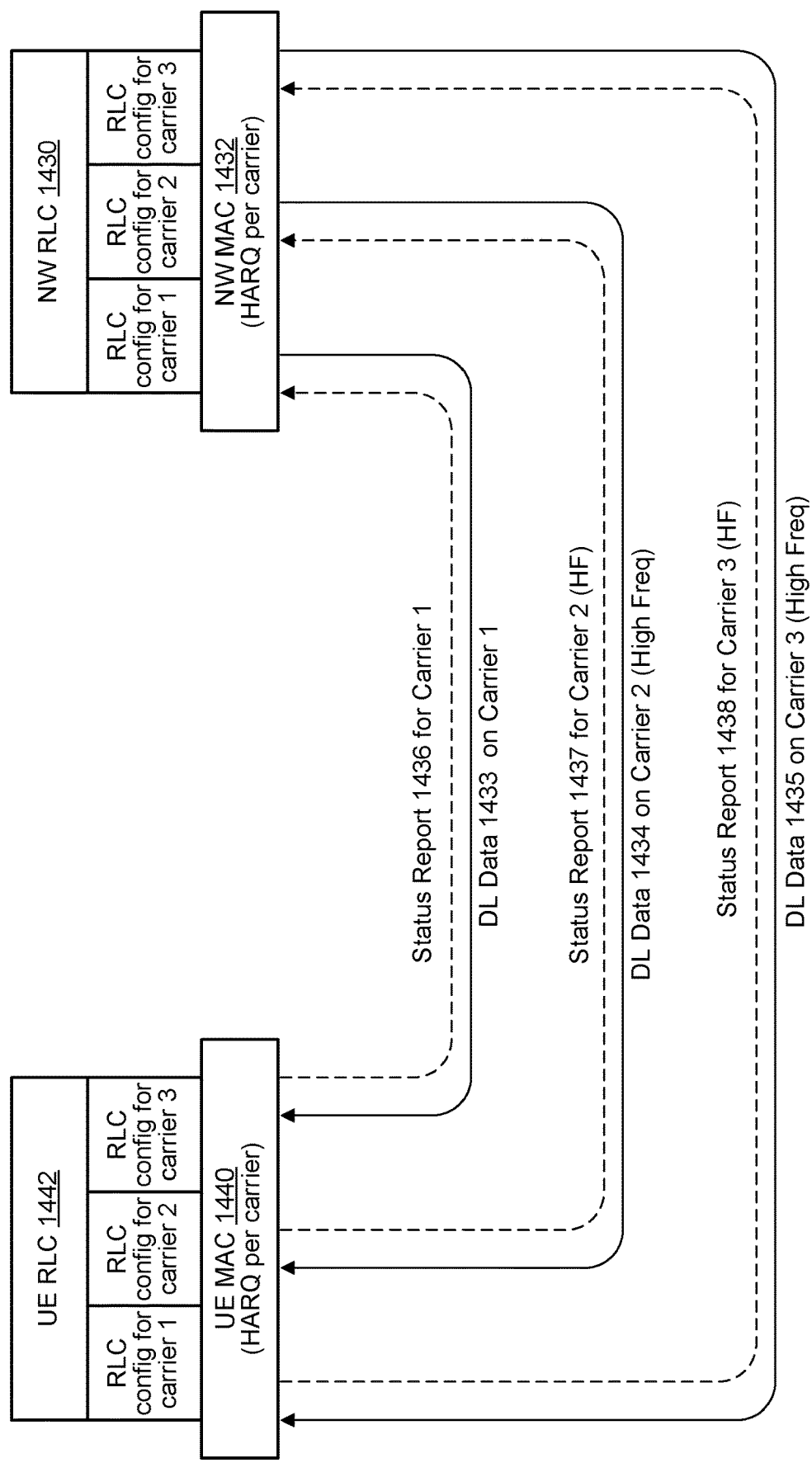

FIG. 14B illustrates a mixed carrier scenario of multicarrier transmission from the NW (e.g., base station) to the UE, according to some embodiments. The carriers include one or more high frequency carriers, represented by carriers 2 and 3, and one or more lower frequency carriers, represented by carrier 1. The NW RLC entity 1430 operates according to a plurality of RLC configurations, i.e., one RLC configuration per carrier. The high frequency carriers (i.e., carriers 2 and 3) may have RLC configurations whose status reporting control parameters have reduced values as compared to the corresponding values for the low frequency carrier (i.e., carrier 1). When the NW RLC entity is sending each RLC PDU to the NW MAC entity 1432, an indication of the carrier (or carriers) to be used for transmission of the RLC PDU may be provided. The NW MAC entity may receive RLC PDUs, and package the RLC PDUs in MAC PDUs for transmission on the carriers. Thus, downlink data items (e.g., MAC PDUs) 1433, 1434 and 1435 may be transmitted respectively on carriers 1, 2 and 3. The UE MAC entity 1440 receives the downlink data items, recovers the RLC PDUs, and provides the RLC PDUs to the UE RLC entity 1442. The UE RLC entity may operate according to a plurality of RLC configuration, i.e., one RLC configuration per carrier. For example, the high frequency carriers (i.e., carriers 2 and 3) may have RLC configurations whose status reporting control parameters have reduced values as compared to the corresponding values for the low frequency carrier (i.e., carrier 1).

The UE RLC entity 1442 may generate and transmit status reports for the carriers based on the respective RLC configuration (and in particular, the respective set of status reporting control parameters). Thus, RLC status reports 1436, 1437 and 1438 may be transmitted respectively for carriers 1, 2 and 3. For example, the status report 1436 may include ACKs and/or NACKs for RLC PDUs transmitted via carrier 1; the status report 1437 may include ACKs and/or NACKs for RLC PDUs transmitted via carrier 2; and the status report 1438 may include ACKs and/or NACKs for RLC PDUs transmitted via carrier 3. In some embodiments, the status report for carrier x is transmitted via carrier x, with x=1, 2, 3. Naturally, this discussion generalizes to any number of carriers and any mix of high frequency carriers and lower frequency carriers.

Furthermore, when the NW MAC 1432 receives a status report from the UE MAC, the NW MAC may recover one or more ACKs and/or one or more NACKs from the status report, and send the ACKs and NACKs to the NW RLC 1442 with corresponding indications of the carrier on which they were received. The NW RLC may then arrange for retransmission of the negatively acknowledged RLC PDUs on the same (or different) carrier.

In alternative embodiments, the NW may configure RTT-related RLC information per sub-carrier-spacing, even within a carrier. For example, different bandwidth parts (BWPs) within a carrier band may have different values of subcarrier spacing.

In one set of embodiments, a method 1450 for operating an apparatus may include the operations shown in FIG. 14C. (The method 1450 may also include any subset of the features, elements or operations described above.) The method 1450 may be performed by processing circuitry, e.g., by the processing element 710 of base station 700, or by the processing element 610 of user equipment 600.

As shown at 1455, the processing circuitry may configure a protocol stack of the apparatus to handle a plurality of carriers, where the protocol stack includes a radio link control (RLC) entity, wherein one or more status reporting control parameters of the RLC entity are configured separately for each of the carriers. The RLC entity (or the status reporting part of the RLC entity) may implement an RLC transmitter and/or an RLC receiver. The RLC entity is connected with a complementary RLC entity at a remote device. (If the apparatus is part of a UE, the remote device would be a base station. If the apparatus is part of a base station, the remote device would be a user equipment.)

In some embodiments, the one or more status reporting control parameters include a first parameter that represents an amount of time to count, starting from a last poll request, before re-transmitting the same poll request, in case there has been no status report from the last poll request.

In some embodiments, the one or more status reporting control parameters include a parameter that represents a number of protocol data unit (PDUs) to count between successive poll request transmissions. See, e.g., the above discussion of the PollPDU parameter.

In some embodiments, the one or more status reporting control parameters include a parameter that represents or indicates a number of bytes (or other data unit) to be transmitted between successive poll request transmissions. See, e.g., the above discussion of the PollByte parameter.

In some embodiments, the one or more status reporting control parameters include a parameter that represents an amount of time to count, starting from a time of last feedback transmission, before allowing another feedback transmission (e.g., status report). See, e.g., the above discussion of the t-PollRetransmit parameter.

As an example, a first of the carriers may have a carrier frequency less than a frequency threshold, and a second of the carrier may have a carrier frequency greater than or equal to the frequency threshold. The RLC entity may be configured so that the one or more status reporting control parameters have smaller values for the second carrier than for the first carrier. The values of the one or more status reporting control parameters for the second carrier may be configured so that the round trip time (RTT)—the time between a RLC PDU transmission and the corresponding feedback—is less than a maximum allowed RTT. The maximum allowed RTT may be a function of subcarrier spacing of the carrier (or bandwidth part).

In some embodiments, the protocol stack may also include a medium access control (MAC) entity interfaced with the RLC entity. (The MAC entity represents a lower layer, between the RLC entity and Physical Layer.) The MAC entity may be configured to operate a plurality of Hybrid Automatic Repeat Request (HARQ) processes, which correspond respectively to the carriers. The MAC entity is connected with a complementary MAC entity in the remote device.

In some embodiments, the apparatus is (or, is included in) a user equipment (UE). The apparatus may include a radio transceiver coupled to the processing circuitry, e.g., as variously described above. The action of configuring the protocol stack may be performed in response to reception of configuration signals from a base station. The configuration signals may indicate the value(s) of the one or more status reporting control parameters for each carrier.

In some embodiments, the apparatus is (or, is included in) a base station. The apparatus may include comprises a radio transceiver coupled to the processing circuitry, e.g., as variously described above.

As an example, a first of the carriers may include two or more bandwidth parts (BWPs) having two or more respective values of subcarrier spacing. The one or more status reporting control parameters of the RLC entity may be separately configured for each subcarrier spacing within the first carrier.

In one set of embodiments, a method 1475 for operating an apparatus may include the operations shown in FIG. 14D. (The method 1475 may also include any subset of the features, elements or operations described above.) The method 1475 may be performed by processing circuitry, e.g., by the processing element 710 of base station 700, or by the processing element 610 of user equipment 600.

As shown at 1480, the processing circuitry may configure a protocol stack of the apparatus to handle a plurality of carriers, where the protocol stack includes a radio link control (RLC) entity, where two or more different subcarrier spacings are represented among the plurality of carriers. One or more status reporting control parameters of the RLC entity may be configured separately for each subcarrier spacing, or, separately for each (carrier, subcarrier spacing) pair.

In some embodiments, larger values of subcarrier spacing correspond to smaller values for the one or more status reporting control parameters. For example, assuming a first of the carriers has subcarrier spacing $SCS_1$, and a second of the carriers has subcarrier spacing $SCS_2$, with $SCS_1 < SCS_2$, then the value of a status reporting control parameter X may be smaller for the second carrier than for the first carrier, where X is, e.g., an element of the parameter set given by {PollPDU, PollByte, t-PollRetransmit, t-statusProhibit}. This property may enable the apparatus to support a decreased round trip time (RTT) related to the RTTs achievable under current 3GPP standards.

In some embodiments, the above mentioned two or more different subcarrier spacings may include a first subcarrier spacing and a second subcarrier spacing that correspond respectively to a first bandwidth part and a second bandwidth part of one of the carriers. Thus, the first and second BWPs may have different sets of values for the one or more status reporting control parameters.

In some embodiments, the one or more status reporting control parameters may include a parameter that represents an amount of time to count, starting from a last poll request, before re-transmitting the same poll request, in case there has been no status report from the last poll request.

In some embodiments, the one or more status reporting control parameters may include a parameter that represents a number of protocol data unit (PDUs) to count between successive poll request transmissions.

In some embodiments, the one or more status reporting control parameters may include a parameter that represents a number of bytes to be transmitted between successive poll request transmissions.

In some embodiments, the one or more status reporting control parameters may include a parameter that represents an amount of time to count, starting from a time of last feedback transmission, before allowing another feedback transmission (e.g., a status report).

In some embodiments, the apparatus is (or, is included in) a user equipment (UE). That apparatus may include a radio transceiver coupled to the processing circuitry, e.g., as variously described above. The action of configuring the protocol stack may be performed in response to reception of configuration signals from the base station, e.g., configuration signals that indicate the value(s) of the one or more status reporting control parameters for each subcarrier spacing.

In some embodiments, the apparatus is (or, is included in) a base station. The apparatus may include a radio transceiver coupled to the processing circuitry. The base station may be, e.g., a gNB or 3GPP New Radio, or an eNB of 3GPP Long Term Evolution.

Communication of L2 Buffer Capability

In some embodiments, in addition to the above described features (or independent of the above described features), the UE may inform the NW about the practical limitations of the UE's L2 buffer size, and the NW can then ensure that it does not schedule UL grants and/or DL data that exceeds the L2 buffer capacity of the UE.

In some embodiments, a reduction of the UE's L2-buffer size may be implicitly defined. First, the UE's total L2 buffer size may be based on the current configuration of the UE, e.g., as described below. The NW may then refrain from scheduling more than X % of the slots (per scheduling period) for UL traffic. (The parameter X may interpreted, e.g., as a maximum duty cycle.) This restraint on scheduling results in the UE's L2 buffer occupancy remaining within X % of the total L2 buffer size, where $$0 < X < 100.$$

Buffer occupancy is the amount of data stored in a buffer at any given time.

In some embodiments, the total L2 buffer size in MR-DC and NR-DC may be calculated as the maximum of the values given by the expressions shown in FIG. 15A. Otherwise, the total L2 buffer size may be calculated based on the following expression:

$$MaxDLDataRate*RLC\ RTT + MaxULDataRate*RLC\ RTT.$$

However, it should be understood that the total L2 buffer size may be calculated using a wide variety of other formulaic expressions and/or methods.

In some embodiments, the values of X2/Xn, Queuing_in_SN, Queuing_in_MN, and RLC RTT for EUTRA may be constrained by the relations given in FIG. 15B. However, it should be understood that those values may be constrained in a wide variety of other ways.

In some embodiments, the round trip time (RTT) (e.g., maximum expected RTT) for an NR cell group may depend on subcarrier spacing (SCS) as shown in the following table.

TABLE

| RLC RTT for NR Cell Group per Subcarrier Spacing | |
|---|---|
| SCS (KHz) | RLC RTT |
| 15 KHz | 50 ms |
| 30 KHz | 40 ms |
| 60 KHz | 30 ms |
| 120 KHz | 20 ms |
| 480 KHz | 5 ms |
| 960 KHz | 2.5 ms |

However, it should be understood that RLC RTT and SCS may be related in a wide variety of other ways.

In alternative embodiments, the UE may provide the explicit indication of the L2 buffer size as part of UE capability information (please see next slide). This buffer size may be the maximum buffer size the UE can support. The NW may ensure, via scheduling, that the UE's L2 buffer size is not exceeded.

In one set of embodiments, a method 1600 for operating an apparatus may include the operations shown in FIG. 16. (The method 1600 may also include any subset of the features, elements or operations described above.) The method 1600 may be performed by processing circuitry, e.g., by the processing element 710 of base station 700.

As shown at 1610, the processing circuitry may cause the base station to determine a percentage of a maximum size of an L2 buffer of a user equipment (UE).

As shown at 1615, the processing circuitry may cause the base station to control a process of scheduling for the UE, so that a buffer occupancy of the UE's L2 buffer does not exceed said percentage of the maximum size.

In some embodiments, the action of determining the percentage comprises receiving uplink signals from the UE, wherein the uplink signals indicate the percentage.

In some embodiments, the action of determining the percentage may include retrieving capability information of the UE from a node of the core network associated with the base station. The percentage may be included in (or, indicated by) the capability information.

In some embodiments, the processing circuitry may cause the base station to calculate the maximum size based on a size formula that is known to both the base station and the UE. In some embodiments, the size formula is defined by the 3GPP 5G New Radio standard.

In some embodiments, the action of controlling the scheduling process includes scheduling downlink transmissions to the UE on no more than said percentage of slots in each scheduling period.

In some embodiments, the action of controlling the scheduling process includes scheduling uplink grants for the UE on no more than said percentage of slots in each scheduling period.

In some embodiments, said percentage corresponds to a decreasing function of an expected bit rate of a radio link control (RLC) stream between the base station and the UE.

In some embodiments, said percentage corresponds to a decreasing function of a subcarrier spacing of a carrier used to convey at least a portion of a radio link control (RLC) stream between the base station and the UE.

In some embodiments, the base station may be a gNB conforming to the 3GPP 5G New Radio standard, or an eNB conforming to the 3GPP Long Term Evolution (LTE) standard.

In one set of embodiments, a method 1700 for operating an apparatus may include the operations shown in FIG. 17. (The method 1700 may also include any subset of the features, elements or operations described above.) The method 1700 may be performed by processing circuitry, e.g., by the processing element 710 of base station 700.

As shown at 1710, the processing circuitry may receive buffer size information indicating a size of an L2 buffer of a user equipment (UE). In some embodiments, the buffer size information may be received as part of uplink signaling from the UE. In other embodiments, the buffer size information may be received as part of UE capability information provided by a node of the core network. The processing circuitry may transmit a request for the UE capability information to the core network node. The core network node may provide the UE capability information in response the request.

As shown at 1715, the processing circuitry may control a process of scheduling for the UE so that a buffer occupancy of the UE's L2 buffer does not exceed the size indicated by the buffer size information.

In some embodiments, the action of controlling the scheduling process may include scheduling downlink transmissions to the UE on no more than X percentage of slots in each scheduling period, wherein X is determined based on the indicated size and a maximum size of the L2 buffer. For example, X may be determined by ratio of the indicated size to the maximum size. The maximum size may be determined based on a predefined formula, e.g., as variously described above.

In some embodiments, the action of controlling the scheduling process may include scheduling uplink grants for the UE on no more than X percentage of slots in each scheduling period, wherein X is determined based on the indicated size and a maximum size of the L2 buffer. The maximum size may be determined based on a predefined formula, e.g., as variously described above.

In some embodiments, the indicated size is less than a maximum size of the L2 buffer; and the indicated size is a decreasing function an expected bit rate of a radio link control (RLC) stream between the base station and the UE.

In some embodiments, the base station is a gNB conforming to the 3GPP 5G New Radio standard.

L2 Buffer Size in UE Capability Information

Figure 18:
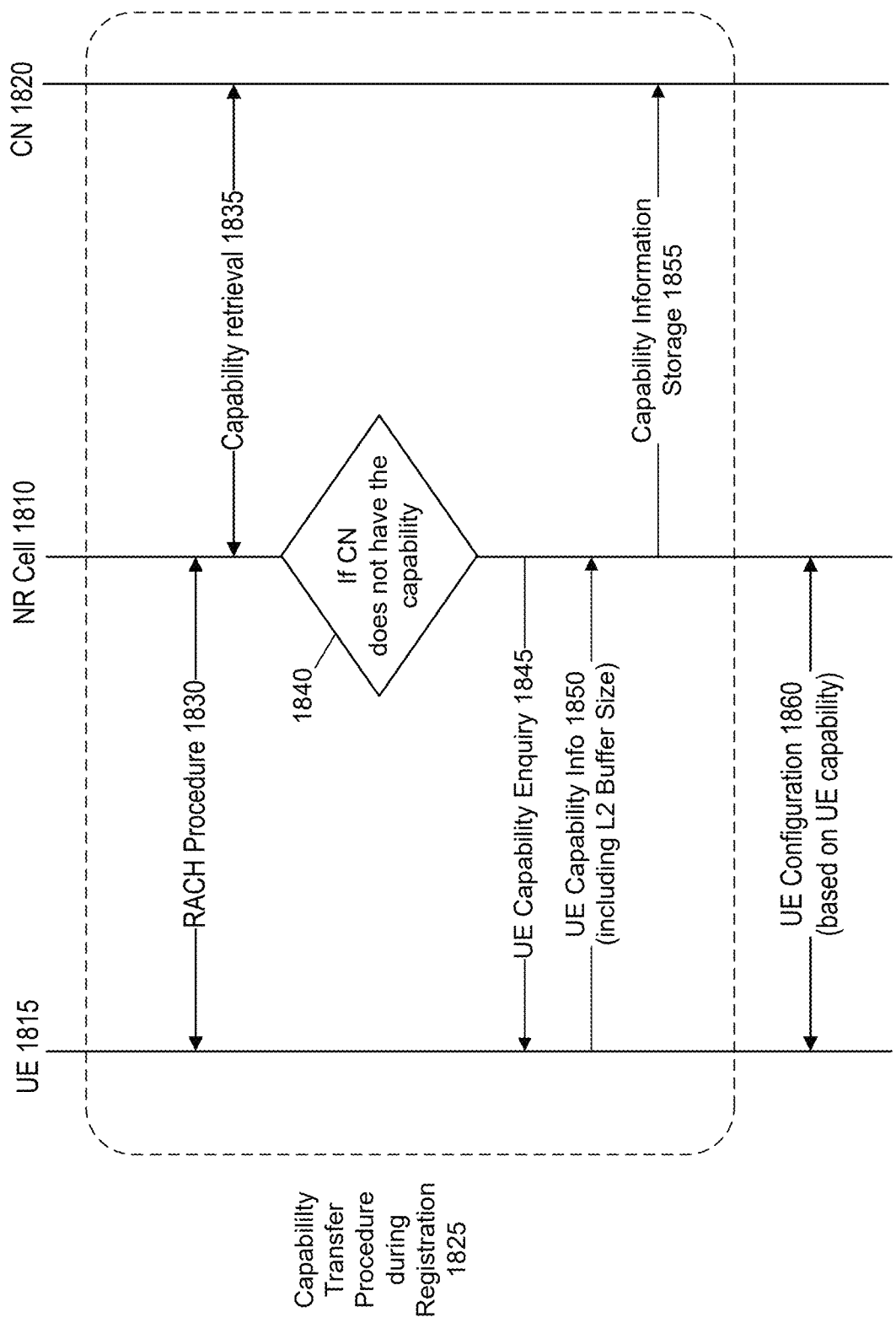
FIG. 18 illustrates a method for configuring a user equipment to handle one or more high frequency carriers, using L2 buffer size information, which is obtained as part of UE capability information, according to some embodiments.

In some embodiments, an indication of the L2 buffer size may be provided as part of a UE capability transaction, e.g., as shown in FIG. 18. As shown in the dotted box, a New Radio (NR) cell 1810 may engage in a capability transfer procedure 1825, e.g., in response to a UE's registration with the network.

At 1830, a user equipment (UE) 1810 may initiate a random access (RACH) procedure with the NR cell. In response to the UE's registration, the NR cell may attempt to retrieve capability information for the UE from a node of the core network 1820, as shown at 1835. If the capability information retrieval is successful, the NR cell may skip to configuration step 1860. If the core network does not have the capability information for the UE, as indicated at 1840, the NR cell may transmit a UE capability enquiry 1845 to the UE.

In response the enquiry, the UE may transmit the UE capability information 1850, including the L2 buffer size of the UE. In response to receiving the UE capability information, the NR cell may store the UE capability information in a node of the core network.

At 1860, the NR cell may configure the UE based on the UE capability information. For example, the NR cell may configure the value(s) of parameters such as PollPDU, PollByte, t-PollRetransmit and t-statusProhibit, e.g., as variously described above. By setting one or more of these parameters to sufficiently small values, the NR cell may ensure that the round trip time (RTT) between the NR cell and the UE is sufficiently small to ensure the amount of L2 data that accumulates in the RTT is less than the L2 buffer size.

In some embodiments, the NW (e.g., the base station) and the user equipment (UE) may communicate at higher data rates, using shorter symbol lengths and/or slot lengths (and correspondingly longer values of subcarrier spacing, such as, e.g., 960 kHz, 480 kHz or 240 kHz). Thus, increased processing demands may be placed upon the UE, e.g., in the PDCP, RLC and MAC layers, in both UL and DL, in shorter periods of time. The UE may need to prepare larger headers and larger amounts of data in shorter periods of time. Depending on feedback latencies, the UE buffering requirements also can increase.

In some embodiments, the NW and UE may adapt to the higher rate (and perhaps, more bursty) UL/DL traffic, to support the increased processing requirements at the UE. The NW and UE may allow more data to be in-transit assuming the current feedback times. For example, the RLC Sequence Number (SN) size may be increased, e.g., from 18-bit to 24-bit or 26-bit. The current 18-bit size itself may not be sufficient for the current FR2 case of $$400 \text{ MHz} \times 16 \text{ carriers} \times 256\text{QAM} \times 4 \text{ layer MIMO.}$$

However, the outstanding data (that needs to be acknowledged) in L2 buffers may be reduced by arranging for faster feedback.

In some embodiments, the NW and UE may maintain the current configuration of RLC and PDCP for in-transit data, but handle the increase in data bursts by arranging for faster feedback from the receiving party. The receiving party may be the UE or the NW. Indeed, the UE and NW may communicate concurrently in both the uplink and downlink directions, e.g., TDD fashion or FDD fashion. (TDD is an acronym for Time Divisional Duplex. FDD is an acronym for Frequency Division Duplex.) Thus, each of the UE and the NW may serve as both a receiving party with respect to one transmission direction and transmitting party with respect to the other transmission direction. Faster feedback (i.e., smaller round trip time between data transmission in one direction and the corresponding feedback transmission in the opposite direction) may be provided using one or more of the following mechanisms.

In some embodiments, shorter status-prohibit timers may be employed, e.g., in the sub-millisecond range—250 µs, 500 µs, 750 µs, etc. For example, a status-prohibit timer may take any value in the interval [100 µs, 1000 µs). The specific values given here are not meant to be limiting. Indeed, a wide variety of values are contemplated.

In some embodiments, shorter poll-retransmit timers may be employed, e.g., in the sub-millisecond range, or in the range below 5 milliseconds.

In some embodiments, the PDCP discard timer may be reduced. (PDCP is an acronym for Packet Data Convergence Protocol.)

In some embodiments, the demand for L2 buffering at the UE may be decreases using one or more mechanisms. For example, the NW may refrain from scheduling more than X % of slots in a time period (similar to a duty-cycle) for UL traffic. The value of X could be determined based on the amount of the outstanding data in the L2 buffer, e.g., the amount averaged over time. Other mechanisms are possible. However, it may be desirable for such mechanisms to introduce no change (or non-disruptive changes) in the logic of the RLC, MAC and PDCP layers in the protocol stack at the UE and NW.

Faster Feedback from Receiving Party

In New Radio (NR), the transmitter of an RLC connection periodically "polls" the receiver of the RLC connection, to cause the receiver to provide status reports back to the transmitter. In response to receiving a poll from the transmitter, the receiver send a status report of which RLC PDUs have been received and which RLC PDUs are missing (not successfully received). PDU is an acronym for protocol data unit. To avoid excessively frequent feedback of status reports (from receiver to transmitter), the following control mechanisms may be provided. The transmitter may regulate when and/or how often the poll request is asserted (i.e., the poll bit is set in the sequence of transmitted PDUs). Furthermore, the transmitter may regulate how often the receiver is allowed to send a status report, e.g., even when the transmitter continuously requests status reports.

In some embodiments, to help avoid accumulation of an excessive amount of to-be-acknowledged data at the receiver, it may be desirable if the receiver sends status reports more frequently than allowed under present 3GPP standards.

In some embodiments, the transmitter may set the poll request more frequently that allowed under present 3GPP standards.

In some embodiments, in case of no response from the receiver, the transmitter may re-submit the poll request earlier (than allowed under present 3GPP standards), by reducing the wait time since the last poll request was sent. In 3GPP parlance, one may reduce the value of the poll-retransmit timer.

In some embodiments, a timer that temporarily inhibits status reporting may be reduced (relative to values allowed under present 3GPP standards), to enable the receiver to provide a larger number of status reports per unit time. This timer may be referred to as the status-prohibit timer.

In some embodiments, values in the single digit millisecond range, such as 1 ms, or 2 ms, up to 5 ms, and values that are sub-1 ms, such as 500 us or 750 us, may better reflect the faster feedback (smaller round trip time) needed for the higher data rates associated with operation on high frequency spectrum (e.g., spectrum higher than 52 GHz).

In alternative embodiments, the NW may configure the UE to discard PDCP packets using shorter discard timers, thereby allowing the UE to not be burdened with buffering large amounts of outstanding to-be-acknowledged data. The resulting increase in PDCP discard rate may occur at the expense of decreased throughput of user data.

Increased Holding at the Receiver

In NR, the RLC transmitter may periodically "poll" (i.e., send a poll request to) the RLC receiver. In response to receiving the poll, the receiver may send a status report to the transmitter, indicating which data units are received and/or which data units are missing.

In some embodiments, the transmitter may be required to store previously transmitted data, until the receiver confirms that the previously transmitted data has been received successfully (i.e., acknowledged).

The status reports from the receiver may include the packet sequence numbers (SN) of RLC PDUs that were missed (not successfully received) and need to be transmitted. Since the range of serial numbers is limited by the bit length of the SN, the SN has to rollover eventually. Thus, the choice of SN bit length is significant. In the 3GPP NR standard, the SN for RLC may be 12 bits or 18 bits. If the SN bit length is 18 bits, there can be $2^{18}$ outstanding RLC packets. With the data rates discussed above, the requirement that the L2 buffer store half that number of packets in transit, i.e., $2^{17}$ packets, can be easily achieved with the current round-trip times (RTT).

In some embodiments, to help avoid the danger of the receiver not being able to recognize whether a received packet with SN 'x' is a retransmission of a previously transmitted packet or a new transmission with a rolled-over serial number, the SN bit-length may be increased from current value of 18 bits.

In some embodiments, the SN bit length may be increased to 24 bits or 26 bits (if the octet alignment is necessary). However, it should be understood that a wide variety of values are contemplated. For example, in other embodiments, the SN bit length may take any value in the interval [19, 30].

In some embodiments, the increase in SN bit length may be for the RLC entity carrying the logical channel that maps the data radio bearer (DRB).

In some embodiments, the SN of the PDCP entity may be increased to 24 or 26 bits (e.g., in addition to the increase in RLC SN bit length). It should be understood that a wide variety of values are contemplated. For example, in other embodiments, the PDCP SN bit length may take any value in the interval [19, 30].

Configuration of Increased SN/Faster Feedback

In 3GPP New Radio (NR), the data radio bearer (DRB) that carries the user data is mapped to an RLC entity, and the RLC-MAC interface that carries the DRB is the logical channel. The MAC entity at the UE may then schedule data for the uplink logical channel based on the UL grant received by UE. The MAC entity at the NW may also schedule data for the downlink logical channel. MAC operation and RLC operation in NR may not vary based on the carriers that carry the physical data. However, when operating with high frequency carriers (e.g., carriers at frequencies greater than 52 GHz), especially when operating in a Non-StandAlone (NSA) mode or a New Radio Dual Connectivity (NR-DC) mode with cells in Frequency Range 1 (FR1), the same user data Radio Bearer (RB) may be data transferred over the high frequency spectrum (e.g., spectrum above FR1) as well as the legacy FR1 spectrum (in NR CA mode or NR DC mode) or LTE spectrum (using, e.g., EN-DC mode). NR CA is an acronym for New Radio Carrier Aggregation. EN-DC is an acronym for E-UTRA-NR Dual Connectivity.

The RLC SN bit length may need to be handled differently for high frequency spectrum vs the FR1/LTE spectrum. For the LTE or NR FR1 leg of operation, use of an increased SN bit length may cause inefficiencies. For example, if poll timing parameters are decreased as described above (to accommodate the high data rates of the high frequency carriers), the lower frequency carriers may experience extra status signaling. (The status messages carry the serial numbers.) Furthermore, increased SN bit length can result in the receiver holding onto data for longer periods of time.

To help avoid the above described issues one or more mechanisms may be employed, as follows.

In some embodiments, the RLC SN bit length increase may be applied only to the RLC entities that carry the radio bearer (RB) and map to the logical channel that carries data using the carriers that operate in the high frequency spectrum (e.g., spectrum above 52 GHz). In some embodiments, the NW is allowed the option to configure this feature.

In some embodiments, the PDCP entity can re-order and re-assemble the PDCP PDU from both data arriving via both legs of RLC communication. (One RLC entity may be used for the high frequency leg, and another RLC entity may be used for the lower frequency leg.)

Reduction of L2 Buffer Space at the UE

As noted above, in 3GPP New Radio (NR), the RLC transmitter may periodically "poll" the receiver to provide status reports back to the transmitter. In particular, the RLC transmitter may set a poll bit in a transmitted PDU. In response to determining that the poll bit is set in a received PDU, the receiver may send a status report to the transmitter, indicating which of the previously transmitted PDUs were successfully received, and which were missed. The transmitter may store previously transmitted data until the receiver confirms that the previously transmitted data has been received successfully. The L2 buffer at the transmitter may be required to have a size that is sufficient to store the amount of data that accumulates until such confirmation arrives. This accumulated data amount depends on the data rate of the logical channel that conveys the data being buffered. The data rate in turn may depend in part on the frequency spectrum being used to convey the logical channel. Large amounts of accumulated data are expected for carriers on high frequency spectrum. It would be desirable to provide a mechanism that allows the RLC transmitter to avoid having to create a large L2 buffer, since the cost of the transmitter depends in part on the size of the L2 buffer.

In some embodiments, the network and/or the UE may provide one or more relaxations for L2 buffer definition at the UE. The NW may be configured to schedule the UE for UL traffic on no more than X % of slots in a scheduling period (similar to a duty-cycle). The NW's scheduling mechanism could be responsive to the amount of outstanding data. This feature may prevent the UE from transferring more uplink data while the UE is awaiting acknowledgement for previously transmitted data. The NW may send status reports on the unacknowledged data, and provide uplink slots to obtain the unacknowledged data, before providing scheduling slots for new uplink data.

In some embodiments, a non-transitory memory medium may store program instructions. The program instructions, when executed by processing circuitry, may cause the processing circuitry to perform any of the method embodiments described above, and any combination of those embodiments. The memory medium may incorporated as part of a base station.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

Any of the methods described herein for operating a user equipment (UE) in communication with a base station (or transmission-reception point) may be the basis of a corresponding method for operating a base station (or transmission-reception point), by interpreting each message/signal X received by the UE in the downlink as a message/signal X transmitted by the base station (or transmission-reception point), and each message/signal Y transmitted in the uplink by the UE as a message/signal Y received by the base station (or transmission-reception point).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A baseband processor comprising processing circuitry, wherein the processing circuitry is configured to perform operations including:

configuring a protocol stack to use a plurality of carriers, wherein the protocol stack includes a first radio link control (RLC) entity and a second RLC entity, both interfaced with a packet data convergence protocol (PDCP) entity, wherein the carriers include one or more first carriers whose respective carrier frequencies are below a frequency threshold, and one or more second carriers whose respective carrier frequencies are greater than or equal to the frequency threshold, wherein said configuring includes configuring the first carriers differently from the second carriers including:
 configuring the first RLC entity to handle the first carriers, wherein the first RLC entity is configured to use a first value of a status reporting control parameter for the first carriers; and
 configuring the second RLC entity to handle the second carriers, wherein the second RLC entity is configured to use a second value of the status reporting control parameter, wherein the second value is configured for the second carriers separately from the first value and is configured to be smaller than the first value, wherein the status reporting control parameter represents an amount of time to count, starting from a time of last uplink feedback transmission, before allowing another uplink feedback transmission.

2. The baseband processor of claim 1, wherein the status reporting control parameter represents:
 an amount of time to count, starting from a last poll request, before re-transmitting the same poll request, in case there was no status report from the last poll request, or
 a number of protocol data unit (PDUs) to count between successive poll request transmissions; or
 a number of bytes to be transmitted between successive poll request transmissions.

3. The baseband processor of claim 1, wherein the first and second RLC entities are configured so that one or more RLC parameter values relating to round trip time are smaller for the second RLC entity than for the first RLC entity.

4. The baseband processor of claim 1, wherein said configuring is performed in response to reception of configuration signals from a base station.

5. A method, comprising:
 configuring a protocol stack to use a plurality of carriers, wherein the protocol stack includes a first radio link control (RLC) entity and a second RLC entity, both interfaced with a packet data convergence protocol (PDCP) entity, wherein the carriers include one or more first carriers whose respective carrier frequencies are below a frequency threshold, and one or more second carriers whose respective carrier frequencies are greater than or equal to the frequency threshold, wherein said configuring includes configuring the first carriers differently from the second carriers including:
 configuring the first RLC entity to handle the first carriers, wherein the first RLC entity is configured to use a first value of a status reporting control parameter for the first carriers; and
 configuring the second RLC entity to handle the second carriers, wherein the second RLC entity is configured to use a second value of the status reporting control parameter, wherein the second value is configured for the second carriers separately from the first value and is configured to be smaller than the first value, wherein the status reporting control parameter represents an amount of time to count, starting from a time of last uplink feedback transmission, before allowing another uplink feedback transmission.

6. The method of claim 5, wherein the status reporting control parameter represents:
 an amount of time to count, starting from a last poll request, before re-transmitting the same poll request, in case there was no status report from the last poll request, or
 a number of protocol data unit (PDUs) to count between successive poll request transmissions; or
 a number of bytes to be transmitted between successive poll request transmissions.

7. The method of claim 5, wherein the first and second RLC entities are configured so that one or more RLC parameter values relating to round trip time are smaller for the second RLC entity than for the first RLC entity.

8. The method of claim 5, wherein the method is performed by a user equipment (UE), wherein said configuring is performed in response to reception of configuration signals from a base station.

9. The method of claim 5, wherein the method is performed by a network element.

10. The method of claim 5, wherein the method is performed by a base station.

11. A user equipment (UE), comprising:
 a radio; and
 a processor communicatively coupled to the radio, wherein the radio and the processor are configured to perform operations comprising:
 configuring a protocol stack to use a plurality of carriers, wherein the protocol stack includes a first radio link control (RLC) entity and a second RLC entity, both interfaced with a packet data convergence protocol (PDCP) entity, wherein the carriers include one or more first carriers whose respective carrier frequencies are below a frequency threshold, and one or more second carriers whose respective carrier frequencies are greater than or equal to the frequency threshold, wherein said configuring includes configuring the first carriers differently from the second carriers including:
 configuring the first RLC entity to handle the first carriers, wherein the first RLC entity is configured to use a first value of a status reporting control parameter for the first carriers; and
 configuring the second RLC entity to handle the second carriers, wherein the second RLC entity is configured to use a second value of the status reporting control parameter, wherein the second value is configured for the second carriers separately from the first value and is configured to be smaller than the first value, wherein the status reporting control parameter represents an amount of time to count, starting from a time of last uplink feedback transmission, before allowing another uplink feedback transmission.

12. The UE of claim 11, wherein the status reporting control parameter represents:
 an amount of time to count, starting from a last poll request, before re-transmitting the same poll request, in case there was no status report from the last poll request, or
 a number of protocol data unit (PDUs) to count between successive poll request transmissions; or
 a number of bytes to be transmitted between successive poll request transmissions.

13. The UE of claim 11, wherein the first and second RLC entities are configured so that one or more RLC parameter values relating to round trip time are smaller for the second RLC entity than for the first RLC entity.

14. The UE of claim 11, wherein said configuring is performed in response to reception of configuration signals from a base station.

\* \* \* \* \*